(12) United States Patent
Albrecht et al.

(10) Patent No.: US 6,212,046 B1
(45) Date of Patent: Apr. 3, 2001

(54) ARM ASSEMBLY FOR A DISK DRIVE DEVICE AND A METHOD FOR FABRICATING THE SAME

(75) Inventors: David William Albrecht, San Jose, CA (US); Akihiko Aoyagi, Fujisawa (JP); Hitoshi Tsujino, Fujisawa (JP); Masahiko Katoh, Fujisawa (JP); Masaki Kobayashi, Fujisawa (JP); Surya Pattanaik; A. David Erpelding, both of San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/156,268

(22) Filed: Sep. 16, 1998

(30) Foreign Application Priority Data

Sep. 26, 1997 (JP) .................................. 9-261483

(51) Int. Cl.$^7$ .................................................. G11B 17/02
(52) U.S. Cl. ........................................................ 360/264.2
(58) Field of Search ..................................... 360/104, 106, 360/266.3, 245.9, 264.2

(56) References Cited

U.S. PATENT DOCUMENTS

| | | | |
|---|---|---|---|
| 5,422,764 | * | 6/1995 | McIlvanie .......................... 360/97.01 |
| 5,668,684 | * | 9/1997 | Palmer et al. ........................ 360/106 |
| 5,872,687 | * | 2/1999 | Arya et al. ............................ 360/104 |
| 6,018,439 | * | 1/2000 | Forbord et al. ....................... 360/104 |

FOREIGN PATENT DOCUMENTS

| | | |
|---|---|---|
| 2-117791 | 5/1990 | (JP) . |
| 3-117869 | 12/1991 | (JP) . |
| 4-145689 | 5/1992 | (JP) . |
| 4-346946 | 12/1992 | (JP) . |
| 6-71425 | 3/1994 | (JP) . |
| 6-335794 | 12/1994 | (JP) . |
| 7-169211 | 7/1995 | (JP) . |
| 7-211020 | 8/1995 | (JP) . |
| 8-46349 | 2/1996 | (JP) . |
| 9-206926 | 8/1997 | (JP) . |
| 9-223304 | 8/1997 | (JP) . |

* cited by examiner

Primary Examiner—Robert S. Tupper
(74) Attorney, Agent, or Firm—Douglas R. Millett

(57) ABSTRACT

An arm assembly for a disk drive device in accordance with the present invention comprises a plurality of arms arranged in parallel to each other, one end of each of said arms supporting a read/write head, and each of said arms having an extended plate which cantilevers from one of side edges of said arm, said extended plate being capable of deflecting in a direction which is vertical to a plane of said arm, and rotationally gimbal to a limited degree about two axes in the plane of said arm, a plurality of first connecting pads provided on each of said extended plates, said first connecting pads being connected to said read/write head, a circuit board which engages with said cantilevered extended plate and is provided with a plurality of second connecting pads characterized in that the plane of said circuit board is approximately orthogonal to said extended plate and is so located with respect to said extended plates of said plurality of arms to align said second connecting pads to said first connecting pads on each of said extended plates.

29 Claims, 17 Drawing Sheets

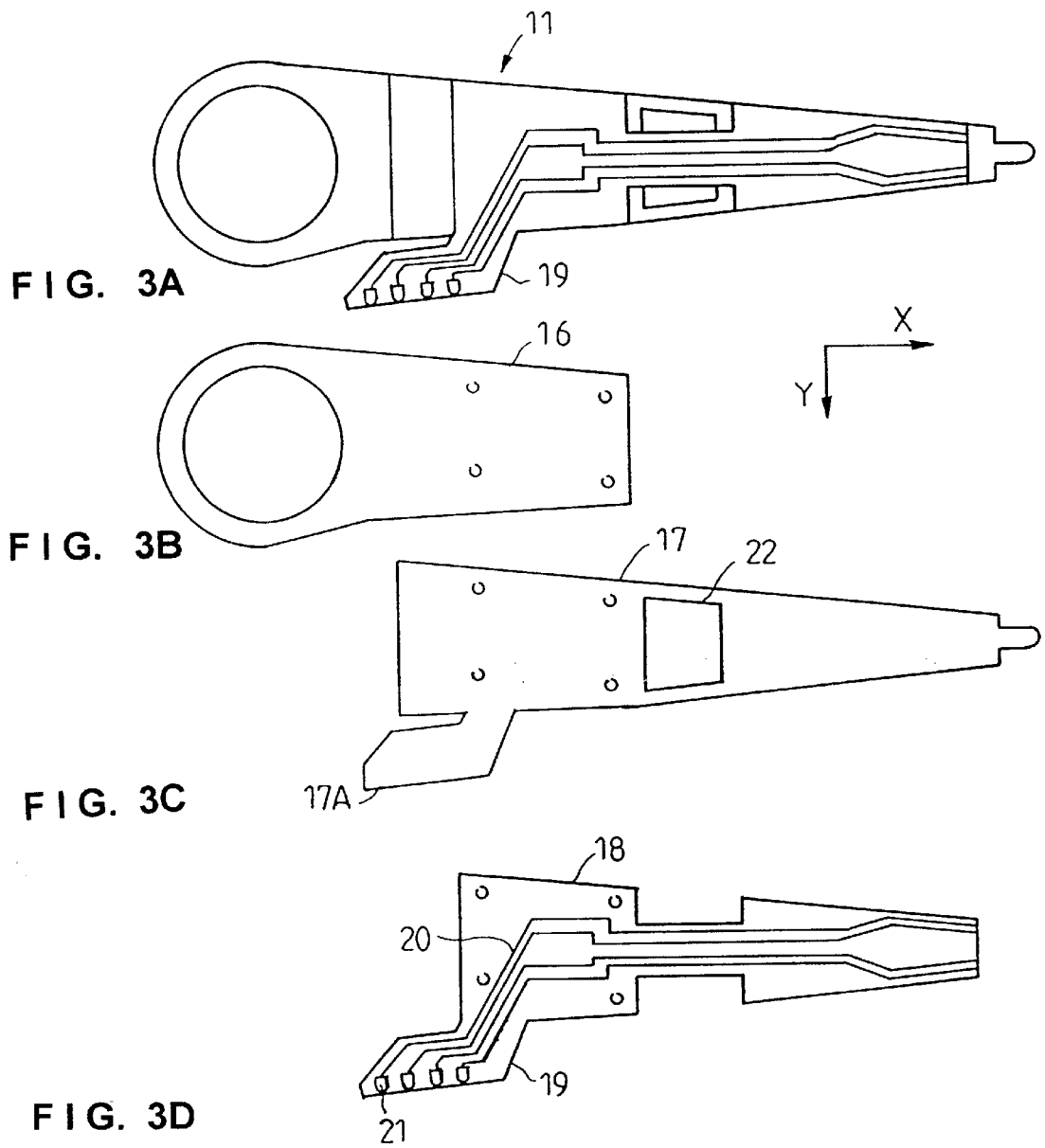

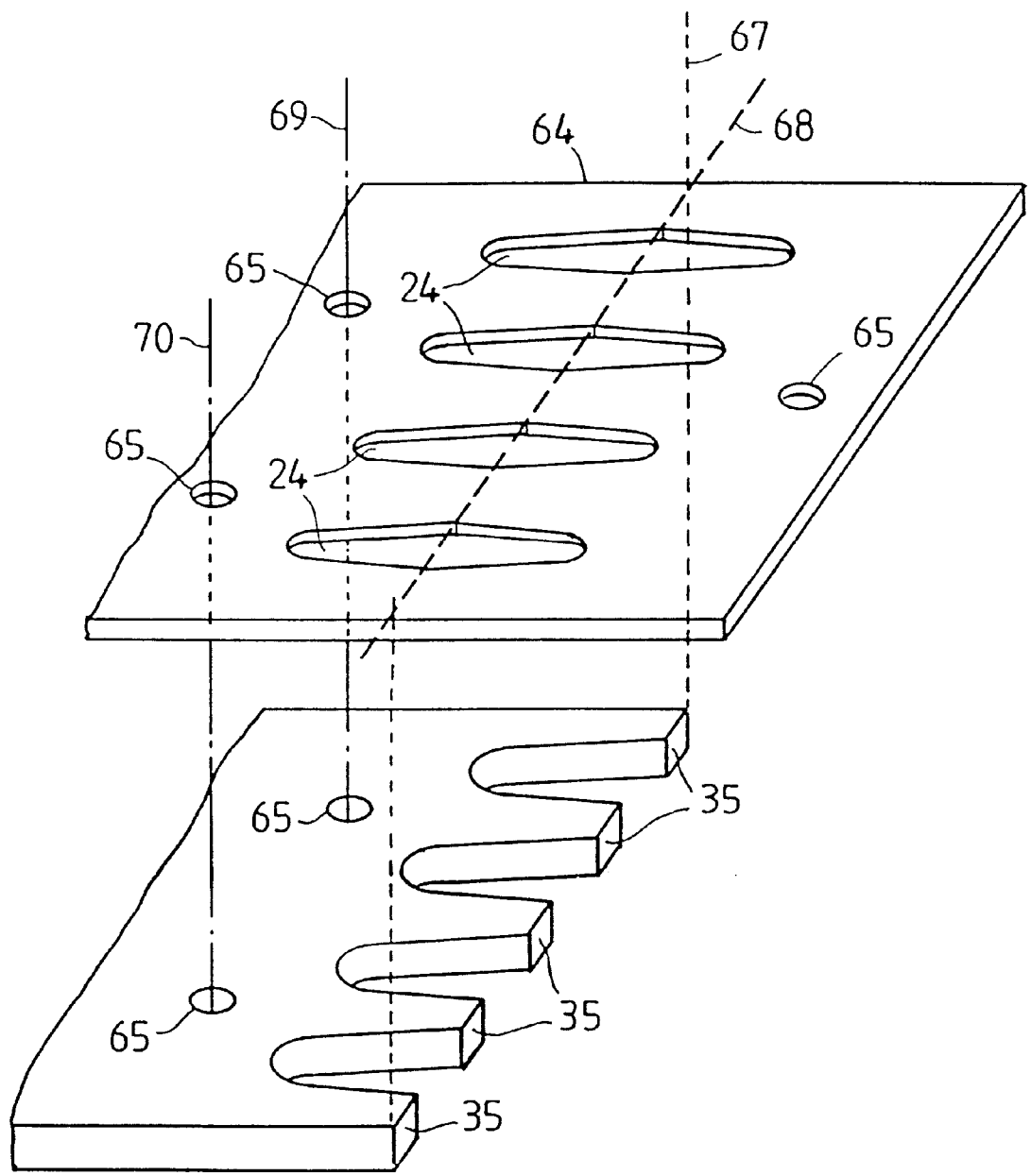
F I G. 19

ARM ASSEMBLY FOR A DISK DRIVE DEVICE AND A METHOD FOR FABRICATING THE SAME

BACKGROUND OF THE INVENTION

FIELD OF THE INVENTION

The present invention relates to an arm assembly for a disk drive device, in which a plurality of arms are stacked on each other, one end of each of the arms is fixed to each other, and the other end of the arms supports a read/write head, and relates to a method for fabricating the arm assembly.

A magneto resistive (MR) head has been used as a read/write head of a disk drive device. The MR head requires four connecting wires. As the number of data recording disks is increased, and a size of the disk drive device becomes small, a wiring process for connecting the four wires of each of the MR heads to pads on a flexible cable becomes time consuming work. FIG. 1 shows a wiring process of a prior disk drive device. As an example, three rotating data recording disks 1, and six arms 2 each of which supports a head/slider assembly 3 are shown. The four discrete connecting wires 4 of the MR head mounted in the head/slider assembly 3 are covered by a tube 5, and the four wires are connected to pads 6 on a flexible cable 7, respectively. Since a width $W_F$ of the flexible cable is very small in a recent disk drive device, the pads 6 are arranged in two columns, and the four wires 4 of the first arm 2 are connected to the four pads 6 in the first column, the four wires 4 of the second arm 2 are connected to the four pads 6 in the second column, and so on. The wires 4 are manually positioned to the pads 6, and connected by solder.

The prior structure as shown in FIG. 1 has caused the following problems. A first problem is that the manual wiring process is a time consuming job, and it increases the fabrication cost of the disk drive device, and the reliability of the entire electrical connection is lowered. A second problem is that since the MR head is easily damaged by electrostatic charges, the wiring should be made with great care. A third problem is that it is difficult to replace a bad MR head with a new MR head since the connections of the discrete wires 4 to the pads 6 are made in the small connecting space.

SUMMARY OF THE INVENTION

The object of the present invention is to provide an arm assembly with an improved structure of the wiring system which solves the problems in the prior disk drive device, and an improved method for fabricating the arm assembly.

An arm assembly for a disk drive device in accordance with the present invention comprises:
- a plurality of arms arranged in parallel to each other with a space, one end of each of the arms supporting a read/write head, and each of the arms having an extended plate which cantilevers from one of side edges of the arm, the extended plate being capable of deflecting in a direction which is vertical to a plane of the arm, and rotationally gimbal to a limited degree about two axes in the plane of the arm,
- a plurality of first connecting pads provided on each of the extended plates, the first connecting pads being connected to the read/write head,
- a circuit board which engages with the cantilevered extended plate and is provided with a plurality of second connecting pads characterized in that the plane of the circuit board is approximately orthogonal to the extended plate and is so located with respect to the extended plates of the plurality of arms to align the second connecting pads to the first connecting pads on each of the extended plates.

The configuration geometry of the circuit board deflects the extended plate in a direction which is generally normal to a plane of the arm to cause the extended plate to exert a self bias force which urges the first connecting pads into intimate contacts or near intimate contact with the respective second connecting pads.

The first connecting pads and the second connecting pads are connected by solder.

A solder volume is provided on each of the first connecting pads and the second connecting pads, and the extended plate which is deflected can move towards the solder volumes on the second connecting pads on the circuit board when the solder volumes become molten on both the extended plate and the circuit board, allowing two solder pair on the first connecting pad and the second connecting pad to coalesce as a single solder volume to form a single connecting solder fillet joint with high reliability and yield.

The solder volume on the first connecting pads of the extended plate is created in a fabrication of the extended plate by stenciling a solder paste on each of the first connecting pad, reflowing the solder paste, and flattening all the reflowed solders with a common anvil to form a plateau that is effectively coplanar for all reflowed solders for minimizing any contact gaps in a Z direction perpendicular to the plane of the arm.

An amount of motion and a compliance of the extended plate in the Z direction to allow the molten solder volume of the respective pad pairs to coalesce and form a single volume is equal to approximately 80% of a height of the flattened solder on the first connecting pads.

The circuit board is provided with a plurality of open ended slots to intersect and receive the cantilevered extended plate of each of the arms, a plurality of the second connecting pads are provided on a surface portion of each of edges of the open ended slots, and the edge of the open ended slot is not exactly parallel to a plane of the arm, but slopes at a low angle that conforms to the natural and deflected state of the extended plate.

A support plate is attached on a back surface of the circuit board, the support plate having side edges along the edges of the open ended slot, the side edge of the support plate being retreated from the edge of the open ended slot by a predetermined distance.

The support plate is made of an electrically nonconductive material, such as plastic.

The first connecting pads are provided on the extended plate along the X axis direction which is substantially parallel to a longitudinal direction of the arm, and a width of the first connecting pad along the X axis direction differs from a width of the second connecting pad along the X axis direction.

A width of the first connecting pad along the X axis direction is preferably wider than a width of the second connecting pad along the X axis direction.

The first connecting pad has a length along Y axis direction which is parallel to a direction along a width of the arm, the first connecting pad has a surface defined by the width and a length, a cross sectional portion of the second connecting pad is intimately adjacent and in close proximity to the surface of the first connecting pad.

The cross sectional portion of the second connecting pad is positioned at a position of about ⅓ of the length along the Y axis of the first connecting pad to accommodate a tolerance of misalignment of the cross sectional portion of the second connecting pad and the first connecting pad in the Y axis or a rotational tilt tolerance of the circuit board about X axis which is a longitudinal direction of the arm.

The first connecting pads are provided on an edge portion of the extended plate along the X axis direction which is substantially parallel to a longitudinal direction of the arm, and a slot is provided in the edge portion of the extended portion to separate the plurality of first connecting pads into two groups, and the first connecting pads and the second connecting pads are tinned with a solder, for providing the extended plate with an enhanced compliance in a direction perpendicular to a plane of the arm to create an intimate contact between orthogonal pad pairs in a pre-reflow state and in a solder reflow state.

An electrically conducive member for shorting the first connecting pads on the extended plate is provided to protect the read/write head from an electrostatic damage, and the electrically conductive member can remain in place until a completion of solder reflow process and can be detached from the extended plate.

Before the formation of the open ended slot is made in the circuit board, the second connecting pads on one edge of the open ended slot and the second connecting pads on the other edge opposing to the one edge are connected to each other, and when the open ended slot is made, the second connecting pads on one edge of the open ended slot and the second connecting pads on the other edge are separated.

The circuit board is formed by stacking a flexible circuit member onto which a plurality of elongated slots, each of which is constituted by the open ended slot and an additional slot which is continuous to the open ended slot, are formed and a support bracket provided with a plurality of open ended slots, each of which is larger than the open ended slot of the flexible circuit member, and cutting the flexible circuit member along a boundary line of the open ended slot and the additional slot.

A space available on the circuit board defined by a height of the plurality of arms in a direction perpendicular to a plane of the arm and a length of the circuit board in a longitudinal direction of the arm is sufficient to package a head element write driver and a read pre-amplifier electronics circuit.

The second connecting pads on the circuit board have no degrees of motion freedom but the second connecting pads are precisely ordered with respect to each being created by a photolithographic process and the first connecting pads of the extended plate are precisely ordered and fixed with respect to each other in three degrees of freedom but can deflect in a direction normal to a plane of the arm and gimbal to a limited degree about the two axes in the plane of the arm.

A method for fabricating an arm assembly for a disk drive device in accordance with the present invention comprises steps of:

preparing a plurality of arms arranged in parallel to each other with a space, each of the arms having an extended plate which cantilevers from one of side edges of the arm, the extended plate being capable of deflecting in a Z axis which is vertical to a plane of the arm, the plurality of the extended plates being provided with a plurality of first connecting pads tinned with a solder, and a circuit board which is provided with a plurality of open ended slots to intersect and receive the cantilevered extended plate of each of the arm, a surface portion of each of edges of the open ended slots being provided with a plurality of second connecting pads tinned with a solder, deflecting the extended plates in the Z direction so as to bring a backside of one extended plate to a backside of adjacent extended plate by a tooling comb, to position the circuit board with respect to each of the extended plates to align the second connecting pads to the first connecting pads, applying a solder flux to the solders on the first connecting pads and the second connecting pads, and heating the solder on the first connecting pads and the second connecting pads with a non-contact heat source to make molten at one time at least one solder pair on all of the first connecting pads on one extended plate and on the second connecting pads aligned to the first connecting pads.

A heat beam from the non-contact heat source is inclined to a plane of the circuit board by a predetermined angle.

Two opposed angled heat beams are directed to the solders on the second connecting pads on one edge of the open ended slot and on the first connecting pads aligned to the second connecting pads, and directed to the solders on the second connecting pads on an edge adjacent to the one edge and on the first connecting pads aligned to the second connecting pads, respectively, and the circuit board and the extended plates of the plurality of arms are supported on a stepper table, the two heat beams are fixed, and the stepper table is stepped to successively position the solders on the first and second connecting pads in the two heat beams.

The two heat beams are Xenon beam laser with an aperture to effect a rectangular beam spot.

The step (c) applies an agent selected from a group of glycerol and detergent, and the step (c) is performed in an inert gas atmosphere to displace most of oxygen present in a normal air environment.

An arm assembly for a disk drive device in accordance with the present invention comprises:

a plurality of arms arranged in parallel to each other with a space, one end of each of the arms being fixed to each other, the other end of each of the arms supporting a read/write head, and each of the arms having an extended plate which cantilevers from one of side edges of the arm, a plurality of first connecting pads provided on each of the extended plates, the first connecting pads being connected to the read/write head, a circuit board provided with a plurality of open ended slots for receiving the extended plates, a plurality of second connecting pads being provided on a surface portion of each of edges of the open ended slots, characterized in that the circuit board is so located with respect to the extended plates of the plurality of arms to align the second connecting pads on the each of edges of the open ended slots with the first connecting pads on each of the extended plates.

The first connecting pads and the second connecting pads are connected by solder.

The first connecting pads are provided on the extended plate along X axis direction which is substantially parallel to a longitudinal direction of the arm, and a width of the first connecting pad along the X axis direction differs from a width of the second connecting pad along the X axis direction.

The first connecting pad has a length along the Y axis direction which is parallel to a direction along a width of the arm, the first connecting pad has a surface defined by the width and the length, a cross sectional portion of the second connecting pad is adjacent and in close proximity to the surface of the first connecting pad.

A support plate is attached on a back surface of the circuit board opposing the surface portion, the support plate having side edges along the edges of the open ended slot, the side edge of the support plate being retreated from the edge of the open ended slot by a predetermined distance.

The support plate is made of an electrically non-conductive material, such as plastic.

The first connecting pads are provided on an edge portion of the extended plate along the X axis direction which is substantially parallel to a longitudinal direction of the arm, and a slot is provided in the edge portion of the extended portion to separate the plurality of first connecting pads into two groups.

An arm assembly for a disk drive device in accordance with the present invention comprises:

a plurality of arms arranged in parallel to each other with a space, one end of each of the arms being fixed to comb elements of a carriage, the other end of each of the arms supporting a read/write head, and each of the arms having an extended plate which cantilevers from one of side edges of the arm, a plurality of first connecting pads provided on each of the extended plates, the first connecting pads being connected to the read/write head, a circuit board provided with a plurality of open ended slots for receiving the extended plates, a plurality of second connecting pads being provided on a surface portion of each of edges of the open ended slots, characterized in that the circuit board is so located with respect to the extended plates of the plurality of arms to align the second connecting pads on the each of edges of the open ended slots with the first connecting pads on each of the extended plates.

A disk drive device in accordance with the present invention comprises: a data recording disks rotated by a drive motor, and an arm assembly, the arm assembly comprising: a plurality of arms arranged in parallel to each other with a space, one end of each of the arms being fixed to each other, the other end of each of the arms supporting a read/write head, and each of the arms having an extended plate which cantilevers from one of the side edges of the arm, a plurality of first connecting pads provided on each of the extended plates, the first connecting pads being connected to the read/write head, a circuit board provided with a plurality of open ended slots for receiving the extended plates, a plurality of second connecting pads being provided on a surface portion of each of edges of the open ended slots, characterized in that the circuit board is so located with respect to the extended plates of the plurality of arms to align the second connecting pads on the each of edges of the open ended slots with the first connecting pads on each of the extended plates.

The first connecting pads are provided on the extended plate along the X axis direction which is the substantially parallel to a longitudinal direction of the arm, and a width of the first connecting pad along the X axis direction differs from a width of the second connecting pad along the X axis direction.

The first connecting pad has a length along the Y axis direction which is parallel to a direction along a width of the arm, the first connecting pad has a surface defined by the width and the length, a cross sectional portion of the second connecting pad is adjacent and in close proximity to the surface of the first connecting pad.

A support plate is attached on a back surface of the circuit board opposing the surface portion, the support plate having side edges along the edges of the open ended slot, the side edge of the support plate being retreated from the edge of the open ended slot by a predetermined distance.

A disk drive device in accordance with the present invention comprises:

data recording disks rotated by a drive motor, and an arm assembly.

The arm assembly comprising:

a plurality of arms arranged in parallel to each other with a space, one end of each of the arms being fixed to comb elements of a carriage, the other end of each of the arms supporting a read/write head, and each of the arms having an extended plate which cantilevers from one of side edges of the arm, a plurality of first connecting pads provided on each of the extended plates, the first connecting pads being connected to the read/write head, a circuit board provided with a plurality of open ended slots for receiving the extended plates, a plurality of second connecting pads being provided on a surface portion of each of edges of the open ended slots, characterized in that the circuit board is so located with respect to the extended plates of the plurality of arms to align the second connecting pads on the each of edges of the open ended slots with the first connecting pads on each of the extended plates.

Method for fabricating an arm assembly for a disk drive device, in accordance with the present invention comprises steps of:

preparing (i) a plurality of arms arranged in parallel to each other with a space, one end of each of the arms being fixed to each other, the other end of each of the arms supporting a read/write head, each of the arms having an extended plate which cantilevers from one of side edges of the arm, a plurality of first connecting pads which are connected to the read/write head being provided on an edge portion of the extended plate along the X axis direction which is the substantially parallel to a longitudinal direction of the arm, each of the first connecting pads being tinned with solder, and (ii) a circuit board provided with a plurality of open ended slots for receiving the extended plates, a plurality of second connecting pads being provided on a surface portion of each of edges of the open ended slots, and each of the second connecting pads being tinned with solder, positioning the circuit board with respect to the extended plates of the plurality of arms to position the solders of the second connecting pads on the each of edges of the open ended slots adjacent to the solders of the first connecting pads on each of the extended plates, respectively, and heating the solders on the first connecting pads and the solders on the second connecting pads to form a reflowed solder connecting the first connecting pads and the second connecting pads.

A volume of solder on the first connecting pad is greater than 60% of a total volume of solders on the first connecting pad and the second connecting pad.

The step (c) includes steps of:
applying a soldering flux on the solders on the first and second connecting pads, and
directing a heat beam to the solders on the first and second connecting pads.

The circuit board and the extended plates of the plurality of arms are supported on a stepper table, a source of the heat beam is fixed, and the stepper table is stepped to successively position the solder on the first and second connecting pads in the heat beam.

The step (c) includes steps of:
applying an agent selected from a group of glycerol and detergent on the solders on the first and second connecting pads, and
directing a heat beam to the solders on the first and second connecting pads.

The step (c) is performed in an atmosphere containing an inert gas.

Method for fabricating an arm assembly for a disk drive device, in accordance with the present invention comprises steps of:
preparing (i) a plurality of arms arranged in parallel to each other with a space, one end of each of the arms being fixed to each other, the other end of each of the arms supporting a read/write head, each of the arms having an extended plate which cantilevers from one of the side edges of the arm, a plurality of first connecting pads which are connected to the read/write head being provided on an edge portion of the extended plates along the X axis direction which is the substantially parallel to a longitudinal direction of the arm, each of the first connecting pads being tinned with solder, a removable plate being attached to the edge portion of each of the extended plates, and an electrical conductor on the removable plate being connected to each of the first connecting pads, and (ii) a circuit board provided with a plurality of open ended slots for receiving the extended plates, a plurality of second connecting pads being provided on a surface portion of each of edges of the open ended slots, and each of the second connecting pads being tinned with solder,
positioning the circuit board with respect to the extended plates of the plurality of arms to position the solders of the second connecting pads on the each of edges of the open ended slots adjacent to the solders of the first connecting pads on each of the extended plates, respectively,
heating the solders on the first connecting pads and the solders on the second connecting pads to form a reflowed solder connecting the first connecting pads and the second connecting pads, and
removing the removable plate from the edge portion of each of the extended plates.

An arm supporting a read/write head for a disk drive device in accordance with the present invention comprises:
a wiring means attached to the arm, and the wiring means contains a support plate supporting a plurality of electrical conductors and an extended plate which cantilevers from one of the side edges of the support plate, each of the electrical conductors has a first connecting portion connected to the read/write head and a second connecting portion arranged on the extended plate for a connection to an external circuit.

A circuit board for a disk drive device in accordance with the present invention comprises:
a supporting layer having at least one open ended slot provided on one end of the supporting layer, and
a plurality of electrical conductors supported on the supporting layer, each of the electrical conductors having a connecting pad for a connection to a read/write head of the disk drive device, the connecting pad being arranged on an edge portion of the open ended slot.

The electrical conductors on the support plate are divided into two pairs of electrical conductors, the electrical conductor on the removable plate includes a first electrical conductor and a second electrical conductor, and one pair of the electrical conductors is shorted by the first electrical conductor, and the other pair of the electrical conductors is shorted by the second electrical conductor.

The extended plate and the removable plate include a metal plate, an insulating layer and the electrical conductors, a plurality of electrically conductive pads respectively connected to the second connecting portions of the plurality of electrical conductors are provided along an edge portion of the extended plate, each of the electrically conductive pads is connected to the electrical conductor on the removable plate through and electrical coupling conductor, a width of which is narrower than a width of the electrically conductive pad, and the extended plate and the removable plate are coupled by a plurality of coupling means, each of which includes the electrical coupling conductor supported by the insulating layer with a width which is narrower than the width of the electrically conductive pad.

A width of the removable plate along a direction of the electrically conductive pad is substantially equal to or less than 0.5 mm.

The electrical coupling conductor is provided with a notch for reducing an area of cross section of the electrical coupling conductor and the insulating layer.

For a fuller understanding of the nature and advantages of the present invention, reference should be made to the following detailed description taken in conjunction with the accompanying drawings.

BRIEF DESCRIPTION OF THE DRAWINGS

FIG. 3 shows the structure of a head support arm in accordance with the present invention.

FIG. 19 shows a fabrication process of the circuit board.

DESCRIPTION OF THE PREFERRED EMBODIMENT

Figure 1:
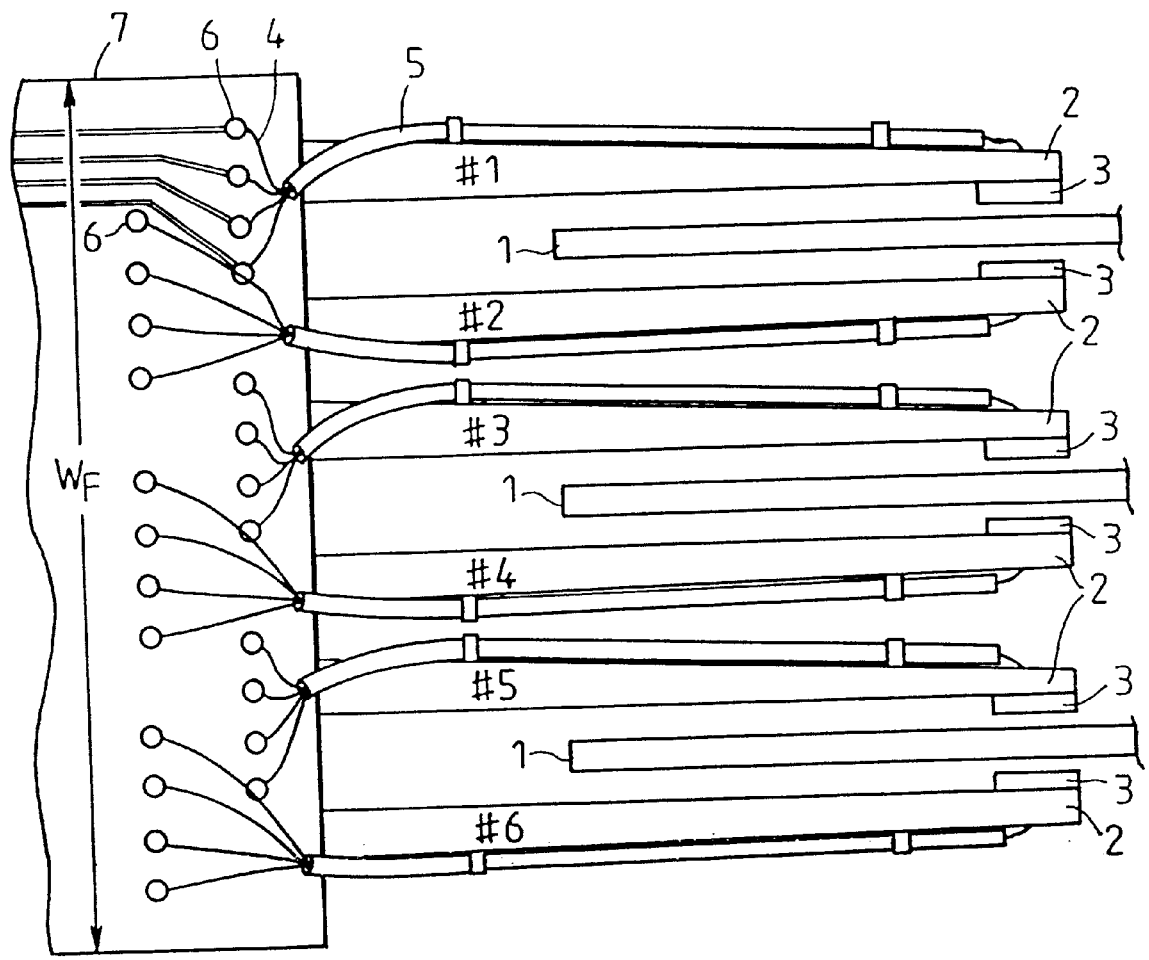
FIG. 1 shows a structure of a wiring system of a prior disk drive device.
Figure 2:
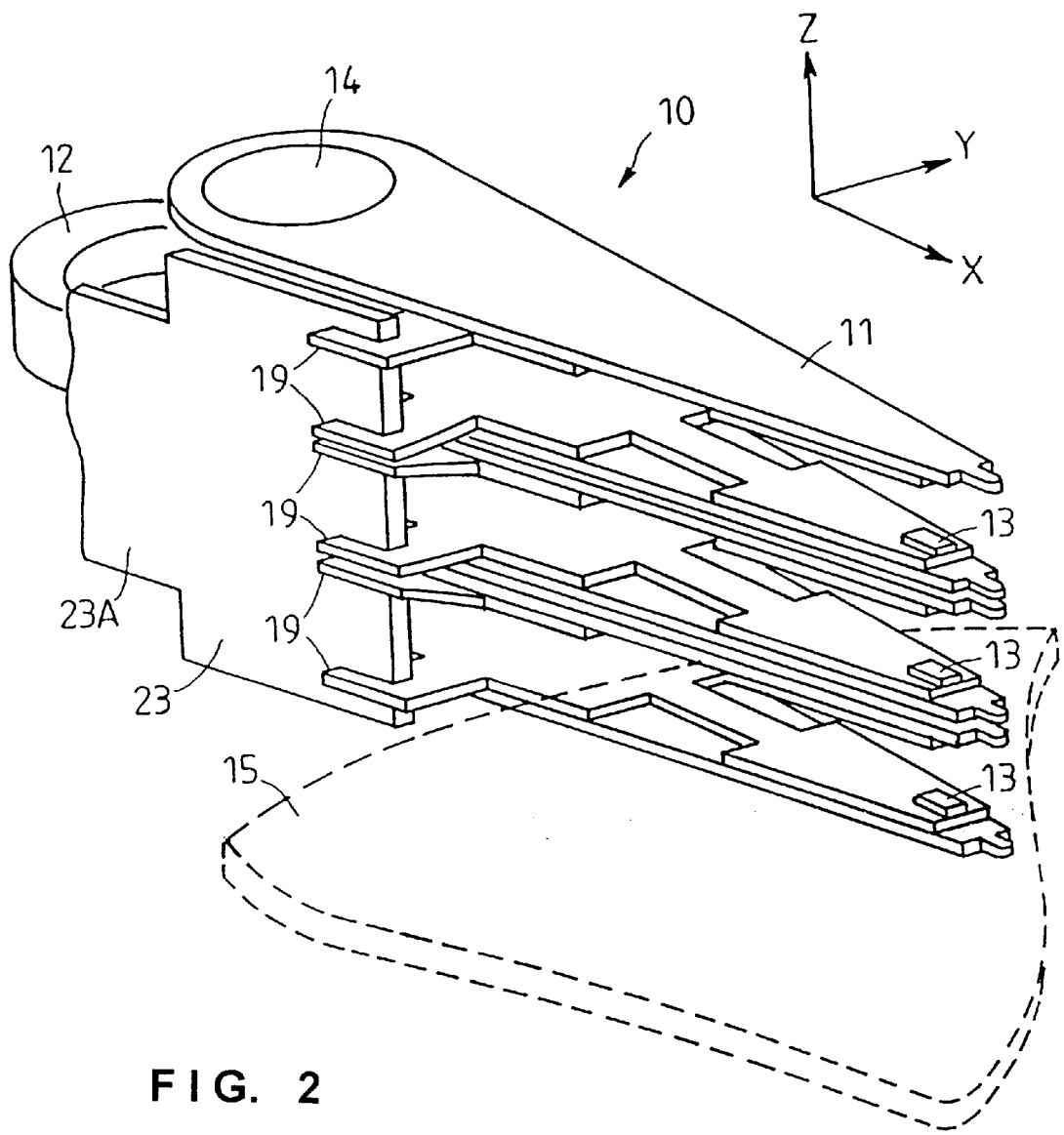
FIG. 2 is a perspective view of an arm assembly in accordance with the present invention.

FIG. 2 shows an arm assembly 10 in accordance with the present invention. In the embodiment of the present invention, the arm assembly 10 containing the ten head support arms 11 is described. However, only six arms 11 for the three data recording disks 15 are shown in FIG. 2 for simplifying the drawing. Each arm 11 supports the read/write head, such as the MR head, for writing data on the three rotating data recording disks 15, such as magnetic recording disks or for reading the data from the data recording disks 15. A front portion of each of the arms 11 supports a head/slider assembly 13 in which the MR head is mounted.

Only one data recording disk 15 is shown by dotted line for simplifying the drawing. The data recording disks 15 are mounted on a spindle motor or a drive motor, not shown. A voice coil motor (VCM) 12 is mounted to the arm assembly 10 to move the head/slider assemblies 13 along a radial direction of the rotating data recording disks 15.

The X axis represents a longitudinal direction of the arm 11, the Y axis represents a direction along a width of the arm 11, and the Z direction which is perpendicular to the X and Y axes represents an axis of the shaft 14. Rear ends of the arms 11 are suitably fixed to each other and connected to a shaft 14 extending in the Z axis, which is pivotally mounted to a frame of the disk drive device, so that the head/slider assemblies 13 are moved in the radial direction by the VCM 12, as described above. The VCM 12 and the spindle motor are controlled by a VCM/spindle driver, not shown.

A read/write circuit, not shown, is connected to the MR heads to control the read/write operation. The VCM/spindle driver and the read/write circuit are contained in the disk drive device, and these are not shown in the drawings since these are well known in the art. A circuit for controlling the read/write head can be mounted on the surface of the circuit board 23. The second connecting pads 26 on the circuit board 23 have no degrees of motion freedom but the second connecting pads 26 are precisely ordered with respect to each being created by a photolithographic process and the first connecting pads 21 of the extended plate 19 are precisely ordered and fixed with respect to each other in three degrees of freedom but can deflect in a direction normal to a plane of the arm 11 and gimbal to a limited degree about the X and Y axes in the plane of the arm 11.

FIG. 3 shows the structure of the arm 11. The arm 11 contains an arm member 16, a load beam 17 and an integrated lead layer 18. These three components 16, 17 and 18 are aligned in the X-Y plane and coupled by being welded at a plurality of welding spots. An aperture 22 is formed in the load beam 17 for defining a bending portion of the arm 11. Four first connecting pads 21 and four wiring conductors 20 connected to the MR head are formed on the integrated lead layer 18 operating as a wiring means by a print circuit technology. The integrated lead layer 18 is provided with an extended plate 19. Four first connecting pads 21 are formed on an edge portion of the extended plate 19 along the X axis, and are aligned in the X-Y plane to minimize any misalignment of the pads 21 around the Z axis passing through the center of the aperture 14, and to minimize any misalignment of the pads 21 around the X axis and the y axis. This alignment is called as an alignment to the datum system of the arm 11.

When the arm member 16, the load beam 17 and the integrated lead layer 18 are assembled, the extended plate 19 cantilevers from one of side edges of the arm 11. A portion 17A of the load beam 17 made of a stainless steel extends below the extended plate 19 to give a predetermined stiffness to the extended plate 19, as shown in FIGS. 3 and 4(B), so that the extended plate 19 has a predetermined compliance, and can be flexed in the Z direction. In FIG. 3, the arm member 16 is shown as extending to the pivot area 14. But, in an alternative configuration, the end portion of the arm member 16 would be a plate with a boss which is fixed to an end of a comb element 61 of a carriage 60 by swaging process known in the art.

Figure 4A:
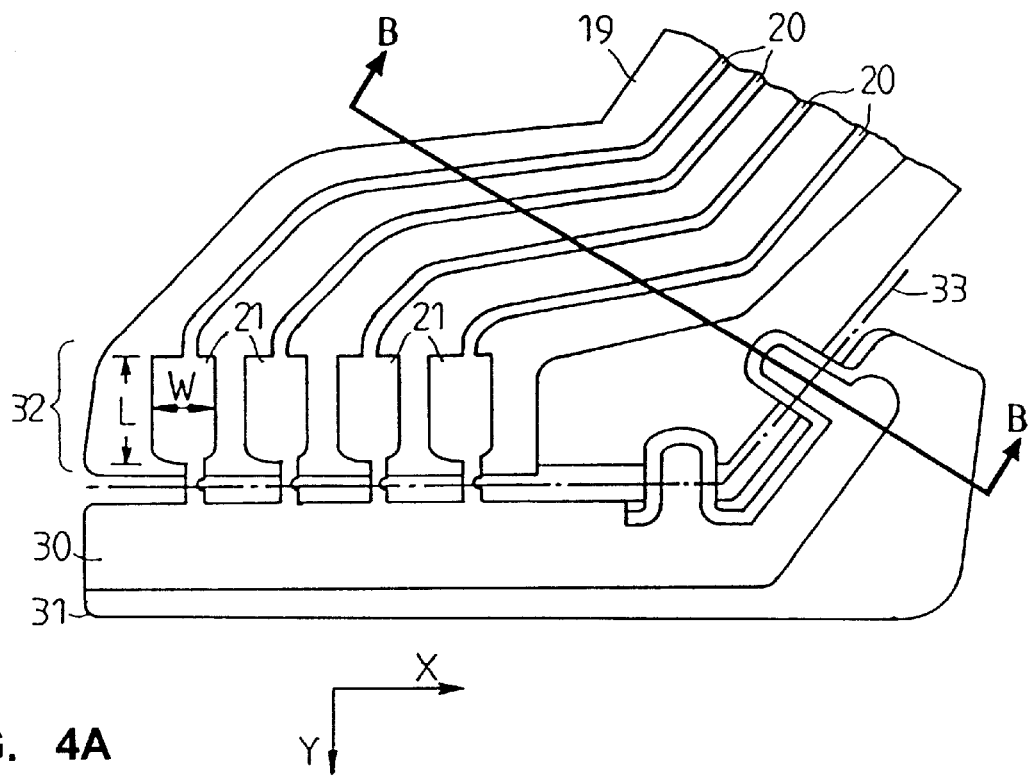
FIG. 4 shows first connecting pads and a removable plate of an extended plate of the head support arm in accordance with the present invention.
Figure 4B:
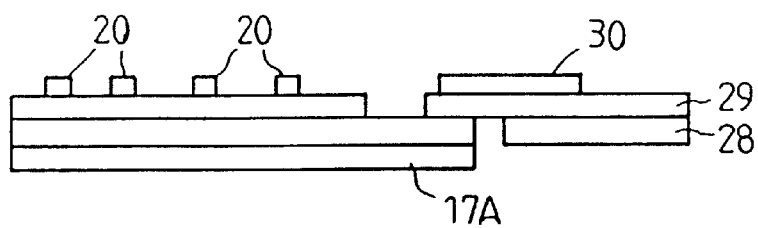

FIGS. 4(A) and (B) shows a detailed structure of the extended portion 19 of the integrated lead layer 18. The four first connecting pads 21 are formed on an edge portion 32 of the extended plate 19, and are aligned in the X-Y plane to minimize any misalignment of the pads 21 around the Z axis passing through the center of the aperture 14. The four pads 21 are arranged substantially along the X direction. A removable plate 31 is attached to the edge portion 32. The electrical conductor 30 on the removable plate 31 is connected to the four first connecting pads 21 connected to the MR head. More particularly, the four first connecting pads 21 are grouped into the two pairs, and one pair is connected to a write element of the MR head, and the other pair is connected to a read element of the MR head. The MR head would be easily damaged by the electrostatic charges during the assembling process, and the conductor 30 connected to the four connecting pads 21 operates as a short circuit to prevent the read and write elements of the MR head from being damaged by the electrostatic charges during the assembling process of the arm assembly 10.

The removable plate 31 of each of the arms 11 is removed along a dashed line 33 after the completion of the arm assembly 10. The first connecting pad 21 has a width W of 0.45 mm and a length L of 0.85 mm.

FIG. 4 (B) shows a cross section along a line B—B in FIG. 4 (A). The integrated lead layer 18 comprises three layers, i.e. a stainless steel plate 28 operating as a support plate, a polyimide layer 29 operating as an insulating layer, and a copper layer forming the wiring conductor 20, the first connecting pads 21 and the conductor 30. The extended plate 19 cantilevered from the arm 11 can flex in the Z direction and rotationally comply about the X and Y axes due to the flexibility of the integrated lead layer 18 and the flexibility of the portion 17A of the load beam 17, as described before. Although all of the four first connecting pads 21 are shorted by the single conductor 30, as shown in FIG. 4(A), the structure can be modified, as below.

The conductor 30 can be divided into a first conductor and a second conductor, and the four first connecting pads 21 are divided into two pairs. A first pair includes the left side two pads 21 connected to the read element of the MR head, and a second pair includes the right side two pads 21 connected to the write element of the MR head. The first conductor is connected to the first pair of pads 21 to short them, and the second conductor is connected to the second pair of pads 21 to short them. It was experimentally confirmed that this connecting scheme remarkably improved the capability of protecting the read and write elements from being damaged by the electrostatic charges.

As shown in FIG. 4(B), the removable plate 31 and the extended plate 19 is coupled by only the insulating layer 29 and the conductor 30, and a width of each of the insulating layer 29 and the conductor 30 is narrower than the width W of the first connecting pad 21. A notch is provided on each of the narrowed portion of the conductor 30 coupling the removable plate 31 to the edge of the extended plate 19 to reduce an area of the cross section of the conductor and the insulating layer, as shown in FIG. 4(A). A width of the removable plate 31 along a direction of the length L of the first connecting pad 21 is equal to or less than 0.5 mm.

Figure 5:
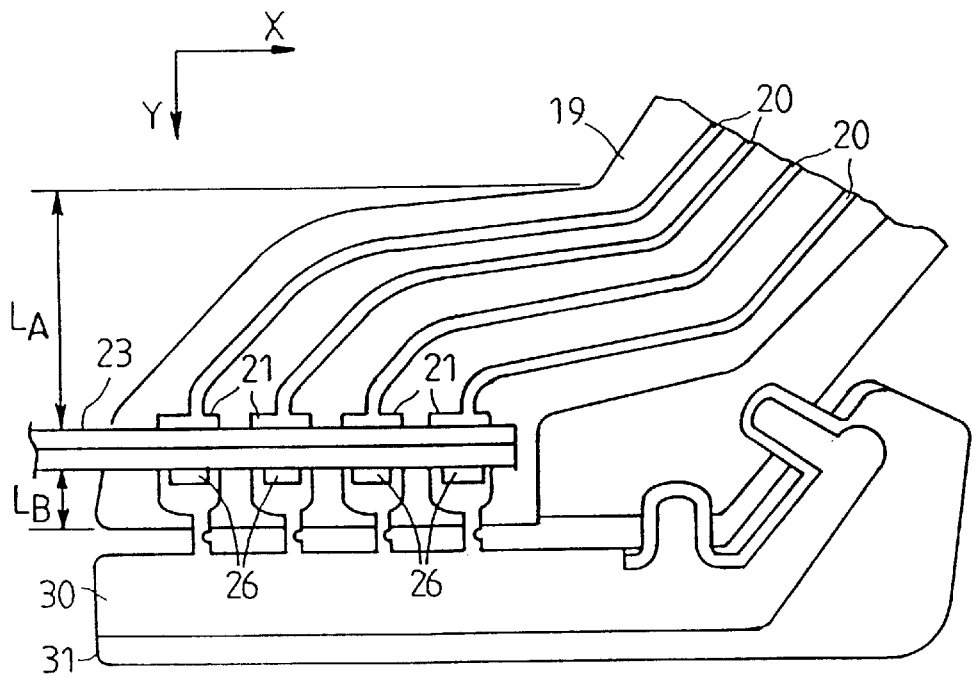
FIG. 5 shows the extended plate and a circuit board in accordance with the present invention.

Referring to FIG. 2 again, a circuit board 23 is attached to the arm assembly 10 in the X-Z plane. The circuit board 23 is provided with a flexible portion 23A. The flexible portion 23A is stationary at the far end, not shown, and is connected to the read/write circuit. FIG. 5 shows the circuit board 23 arranged in the X-Z plane and the extended plate 19 arranged in the X-Y plane. The plane of the circuit board 23 is essentially orthogonal to the plane of the arm 11. A major part of the extended plate 19 after the removable plate 31 is removed is divided into a first portion with a distance $L_A$ at the backside of the circuit board 23 and a second portion with a distance $L_B$ at the front side of the circuit board 23. The distance $L_B$ is shorter than the distance $L_A$. The wiring conductors 20 are hidden by the circuit board 23 after the completion of the arm assembly, so that the wiring conductors 20 are protected from any damage.

Referring to FIG. 6, a detail of the structure of the circuit board 23 is shown. Open ended slots 24 are formed on a front end of the circuit board 23. Each straight edge 25 of the open ended slot 24 is inclined from the X axis by a predetermined angle $_1$. The four second connecting pads 26 are provided on a surface portion 34 of each of the straight edges 25 of the open ended slots 24. Wiring conductors 27 are connected to the second connecting pads 26, respectively. For simplifying the drawing, only eight wiring conductors 27 are shown. The wiring conductors 27 are extended on the flexible portion 23A and are connected to the read/write circuit. The second connecting pads 26 provided on one edge 25 of the circuit board 23 are connected to the first connecting pads 21 on the extended plate 19 of one head supporting arm 11 by soldering in accordance with the present invention. Therefore, the ten edges 25 are provided on the circuit board 23 for the ten head support arms 11.

Figure 6A:
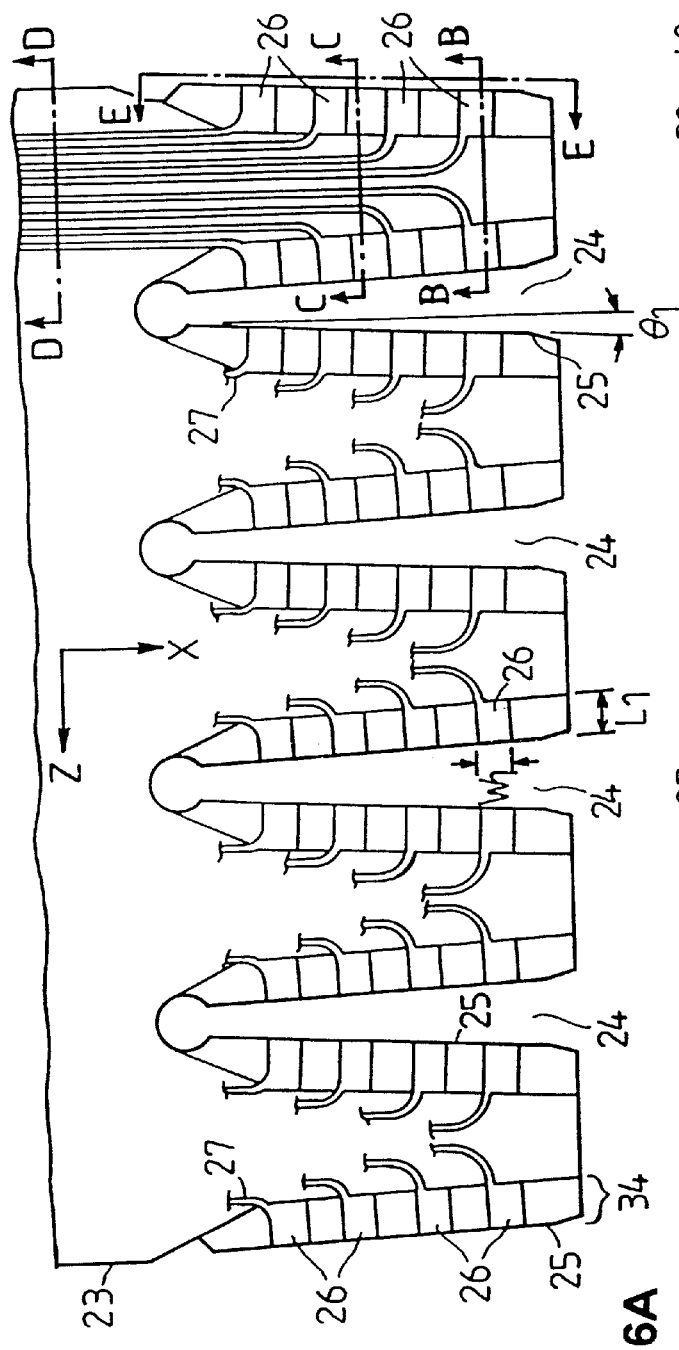
FIG. 6 shows the structure of the circuit board in accordance with the present invention.
Figure 6B:
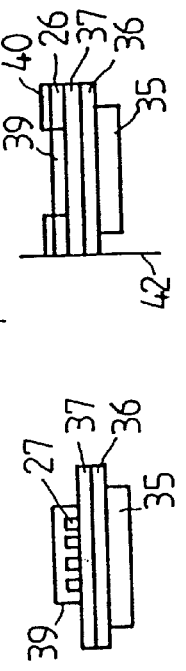
Figure 6C:

Cross sections along a line B—B, C—C, D—D, and E—E in FIG. 6(A) are shown in FIGS. 6(B), (C), (D) and (E), respectively. As shown in FIGS. 6(C) and (D), the circuit board 23 basically comprises five layers, i.e. a non-electrically conductive support bracket 35, such as a plastic material, a first polyimide layer 36, a second polyimide cover layer 37, a copper (Cu) layer 26 and 27, and a third polyimide layer 39. The copper layer is masked and etched to form the second connection pads 26 and the wiring conductors 27. The surfaces of the second connecting pads 26 are tinned with the solder 40.

The fabrication process of the circuit board 23 comprises steps of (a) forming the patterns of the wiring conductors 27 and the second connecting pads 26 in which the connecting pads 26 of the one edge are continuous to the connecting pads 26 of the opposed edge by using a well known photolithographic technology in the art, and tinning the solder on the surfaces of the second connecting pads 26, and (b) forming the open ended slots 24 at the end of the circuit board 23 by using a well known punching technology in the art. The edge 25 of the pad 26 is formed when the open ended slot 24 is formed. A cut surface of the solders 40, the second connecting pads 26, and the two polyimide layers 37 and 36 is called as a cross sectional portion. The edge 25 is inclined from the X axis by the angle $\theta_1$. Therefore, the plane of the cross sectional portion 41 of the solder 40 and the second connecting pads 26 is in the plane offset from the X-Y plane by angle $\theta_1$, and a small displacement in the Z direction.

The cross sectional portion 41 of the solder 40 and the second connecting pads 26 is normally adjacent and in contact to the surface of the solder on the first connecting pad 21 of the extended plate 19, as described later with reference to the FIGS. 9 through 13. However, manufacturing tolerances in the components and assembly can create a condition where the solder of the all pad pairs 21 and 26 of the respective extended plate 19 and the circuit board 23 are not in intimate contact, and a finite gap in the Z direction exists, as shown in the FIG. 16(C). A typical width $W_1$ of the pad 26 is 0.3 mm, and a length $L_1$ of the pad 26 is 0.45 mm. It is noted that the width $W_1$ of the second connecting pad 26 differs from the width W of the first connecting pad 21.

In the embodiment described, the width $W_1$ of the second connecting pad 26 is narrower than the width W of the first connecting pad 21. But, it is possible to use the structure in which the width $W_1$ is wider than the width W. The difference in the width of the pads 21 and 26 compensates for a misalignment of the pads 21 and the pads 26 in the X direction, as described with reference to FIG. 15. The relationship of W to $W_1$ is preferable, since a larger solder volume can be placed on the pad 21.

Figure 6D:
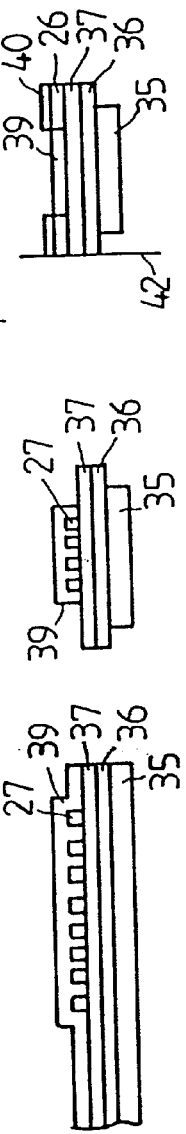
Figure 6E:
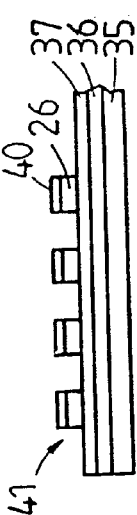

In FIG. 6(B), a line 42 of the cross sectional portion 41 of the solder 40, the second connecting pads 26, and the second and first polyimide layers 37 and 36 is vertical to the surface of the circuit board 23. The third polyimide cover layer 39 remains on the second polyimide layer 37 between the two pads 26. In FIG. 6(C), the third polyimide cover layer 39 entirely covers the four wiring conductors 27. In FIG. 6(D), the third polyimide cover layer 39 entirely covers the surface of the structure.

FIG. 19 shows a process for assembling the circuit board 23. The circuit board 23 contains a flexible circuit member 64 and an electrically non-conductive member having a plurality of brackets 35 at its front portion. The flexible circuit member 64 is provided with a plurality of elongated slots, each of which is constituted by the open ended slot 24 shown at the left side of the dotted line 68 and an additional slot shown at the right side of the dotted line 68, which is continuous to the open ended slot 24. Although, as shown in FIG. 6, the second connecting pads 26 and the wiring conductors 27 are formed on the surface portion of the edges of the open ended slots 24 of the flexible circuit member 64, these are not shown in the FIG. 19.

A plurality of open ended slots defining the support brackets 35 are formed on the front portion of the electrically non-conductive member. The open ended slot of the electrically non-conductive member is larger than the open ended slot 24. In the first step of the assembling process, datum pins of an alignment jig, not shown, are inserted into alignment holes 65 of the electrically non-conductive member and the flexible circuit member 64, whereby both the members are precisely aligned to each other, as shown by the dotted line 67. In the second step, the front portion of the flexible circuit member 64 is cut along the dotted line 68.

Figure 7:
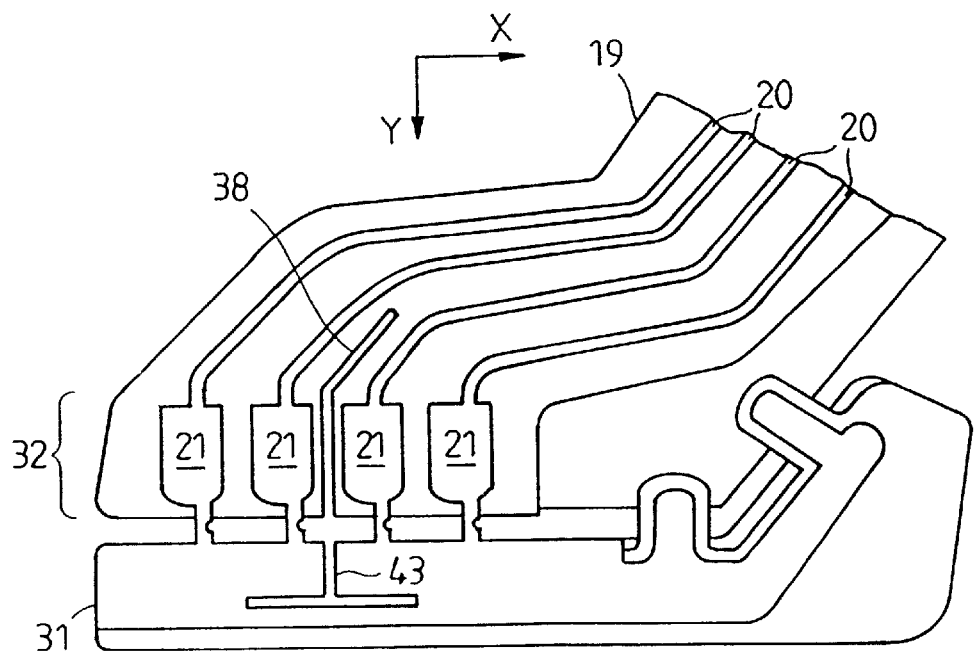
FIG. 7 shows an alternate embodiment of the extended plate in accordance with the present invention.

FIG. 7 shows an alternate structure of the extended plate 19, in which a slot 38 is provided in the edge portion 32 and extended to a region between the wiring conductors 20 to separate the four first connecting pads 21 into the two groups, and an additional slot 43 is formed in the removable plate 31 so that a pair of left side connecting pads 21 can have an additional independent compliance in the Z direction as reference to the right side pads 21.

FIG. 8 shows a process for forming the solder on the first connecting pads 21. The volume of solder required for the solder reflow joint, shown in FIG. 13, of the first connecting pad 21 and the second connecting pad 26 is on the order of $40 \times 10^{-6}$ cc. It has been discovered by the inventors of the present invention that the volume of solder on the first connecting pad 21 should be greater than 60% of the total volume of solder on the first connecting pad 21 and the second connecting pad 26 to make a reliable solder reflow connection between the first and second connecting pads 21 and 26. The solder is screened onto the first connecting pads 21 through a stencil. A size of apertures and a thickness of the stencil are selected to control the volume of solder dispensed onto the pad 21.

Figure 8A:
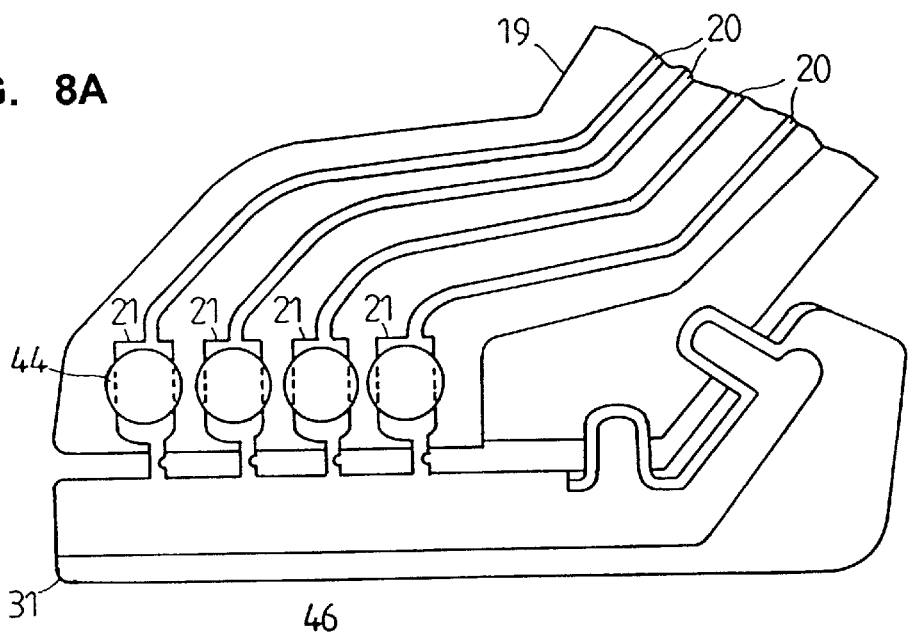
FIG. 8 shows flattened solders on the first connecting pads on the extended plate in accordance with the present invention.
Figure 8B:
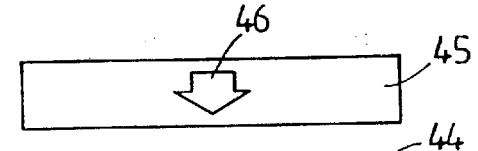
Figure 8C:
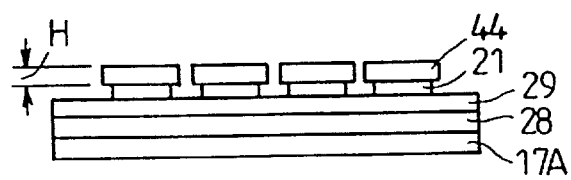
Figure 9A:
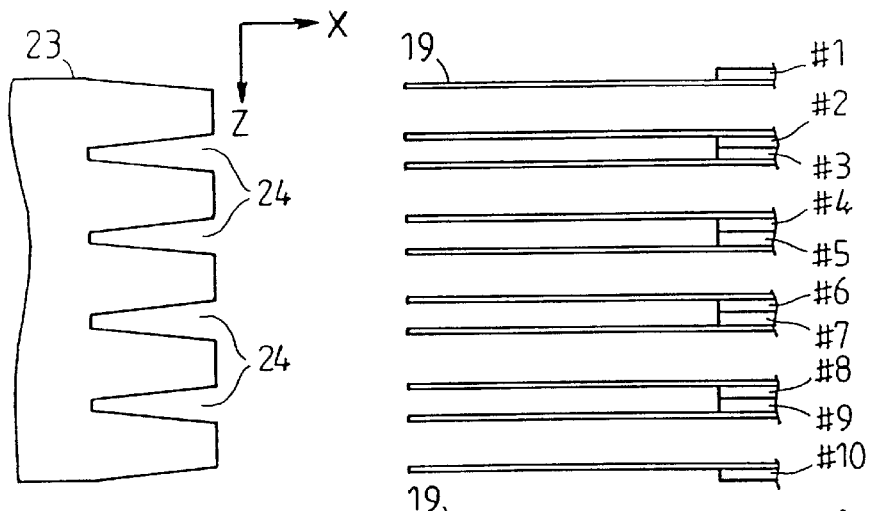
FIG. 9 shows steps for assembling the extended plates and the circuit board in accordance with the present invention.
Figure 9B:
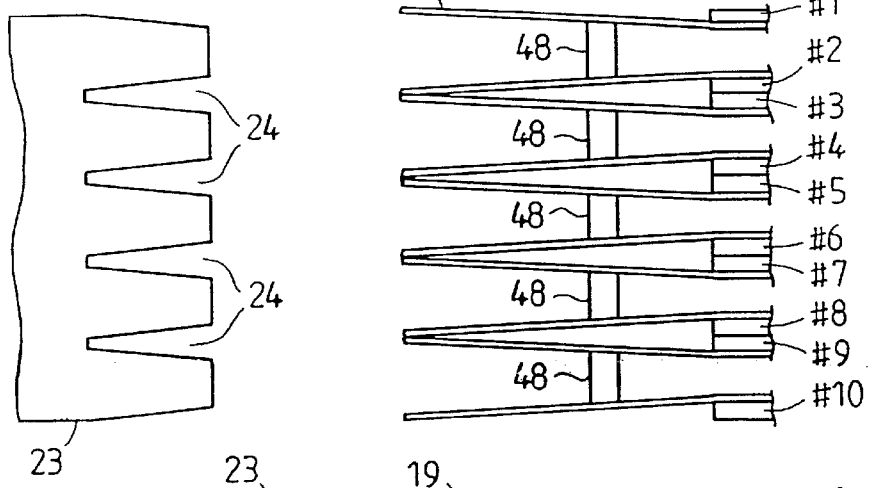
Figure 9C:
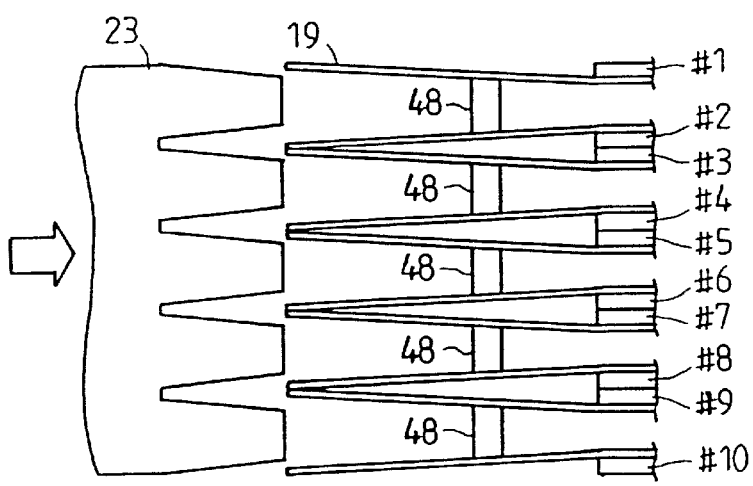
Figure 10:
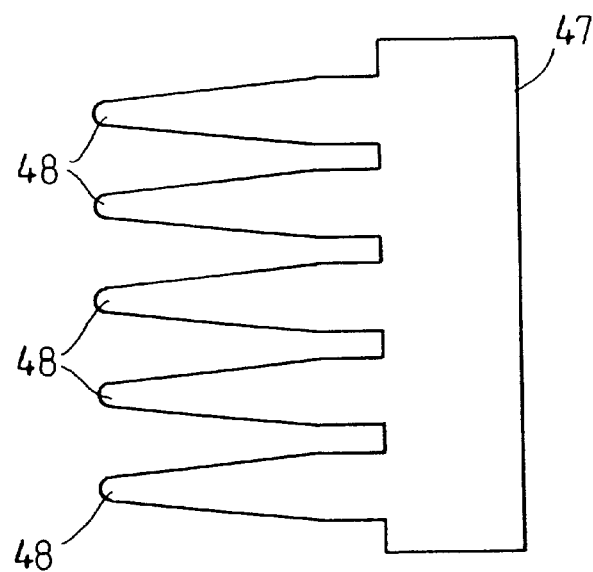
FIG. 10 shows an comb like tool used in the assembling step.

The solders 44 on the pads 21 are reflowed, as shown in FIG. 8(B). The reflowed solders 44 are flattened by a flat compression press board 45 urged in a direction shown by an arrow 46, so that an upper surface of each of the solders 44 are aligned in a straight line, as shown in FIG. 8(C). The upper surface of the solders 44 are coplanar in alignment, as shown by the straight line in FIG. 8(C). Circles 44 in FIG. 8(A) represents the flattened solders. In practice, the actual shape is elliptical. The height H of the solder 44 is on the order of 100 m. It is noted that the extended portion of the flattened solder 44 beyond the vertical wall of the pad 21 is drawn towards the center of the pad 21 when the solder 44 is reflowed, as shown in FIG. 13(B).

FIGS. 9 through 14 show a fabrication method for assembling the circuit board 23 and the extended plates 19 of each of the arms 11. FIG. 9(A) shows the relationship of the open ended slots 24 of the circuit board 23 and the ten extended plates 19 of the ten head supporting arms 11 for the five magnetic recording disks, not shown. The first connecting pads 21 on the extended plate 19 and the second connecting pads 26 on the surface portion 34 of the circuit board 23 are not shown in FIG. 9 for simplifying the drawing. In the fabrication step shown in FIG. 9(B), each pair of the extended plates 19 are bent by a tooth 48 of the comb-like tool 47, shown in FIG. 10, since the extended plates 19 cantilevered from each of the arm 11 can flex in the Z direction due to the flexibility of the integrated lead layer 18 and the flexibility of the portion 17A, as described before. The pair of extended plates 19, i.e. #2 and #3, #4 and #5, #6 and #7 and #8 and #9, are so displaced that the backsides of the leading edges (left end in FIG. 9) of the paired extended plates 19 contact each other. In the fabrication step shown in FIG. 9(C), the circuit board 23 is moved towards the extended plates 19.

Figure 11:
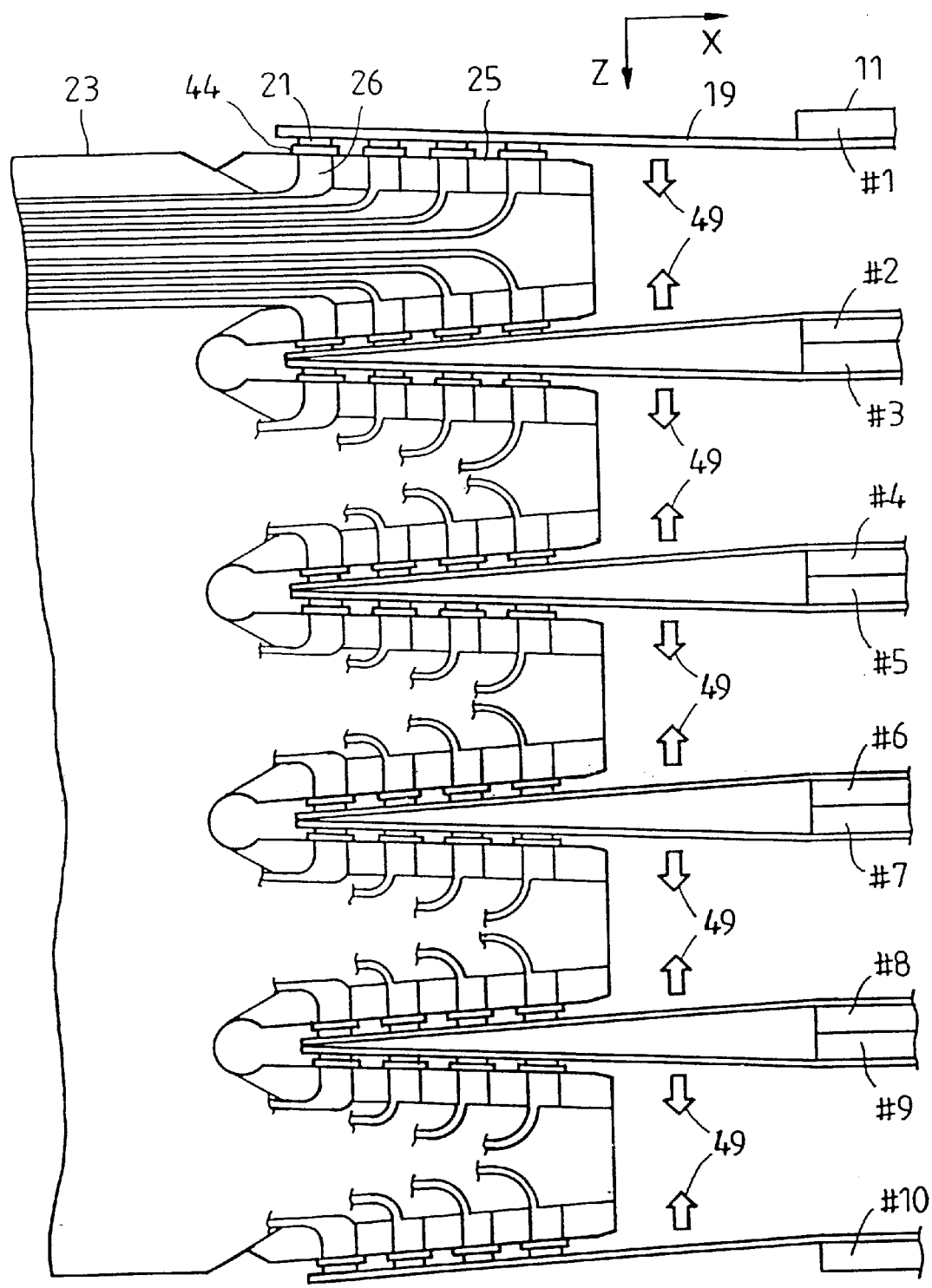
FIG. 11 shows the structure in which the extended plates are fully inserted along open ended slots of the circuit board.
Figure 12A:
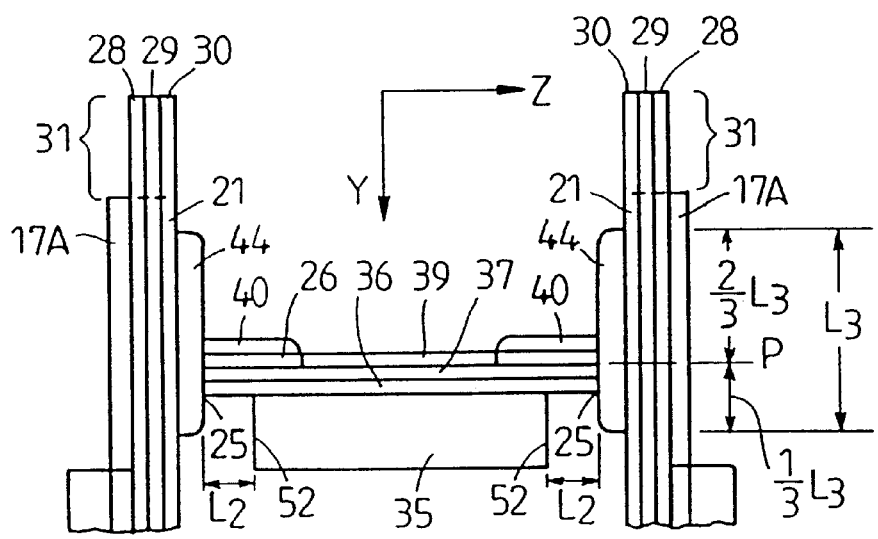
FIG. 12 shows a reflowing process in accordance with the present invention.

FIG. 11 shows the structure in which the extended plates 19 are fully inserted along the edges 25 of the open ended slots 24 of the circuit board 23, and the comb-like tool 47 is removed. When the comb-like tool 47 is removed, each of the extended plates 19 tends to move in a direction shown by an arrow 49 due to its compliance or flexibility in the Z direction to return to its free or undisplaced state, so that the flattened solders 44 on the first connecting pads 21 shown in FIG. 8(C) intimately contact onto the cut surface or the cross sectional portions 41 of the solders 40 and the second connecting pads 26 of the circuit board 23, as shown in FIG. 12(A). However, because of tolerances in the manufacturing and assembling process and tolerances of the component parts, not all pads of an array set will be in perfect intimate contact, as shown in FIG. 16(C), a finite separation gap in the Z direction can exist between the pads 21 and 26.

Figure 12B:
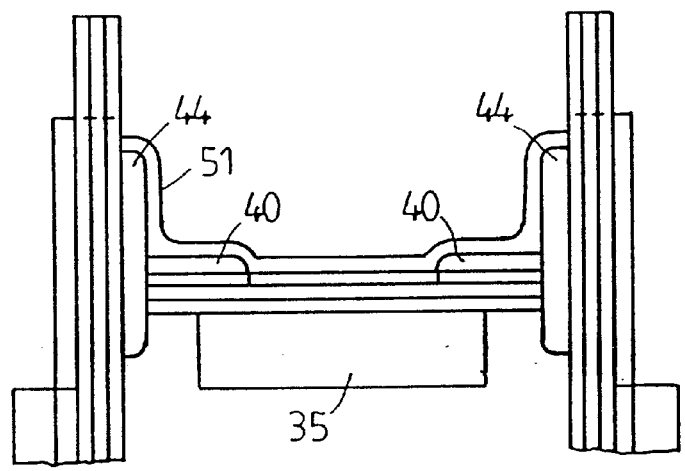
Figure 12C:
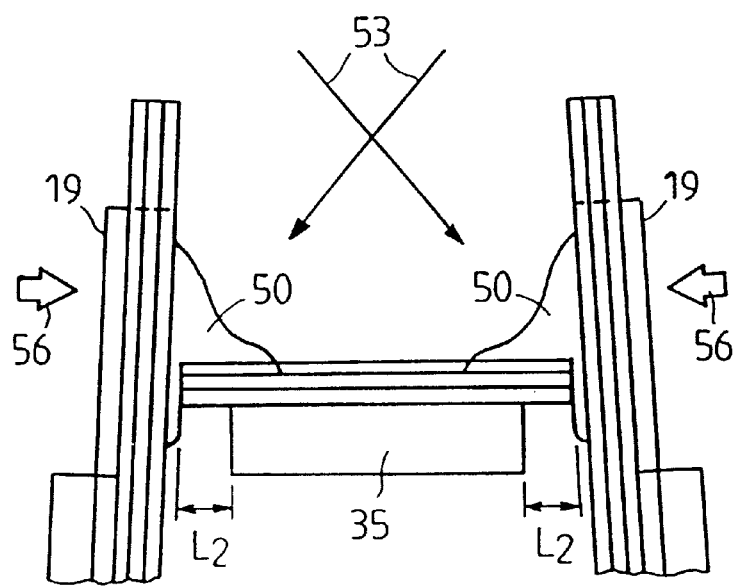

As shown in FIGS. 12(A) through 12(C), it is noted that the removable plate 31 of each of the extended plates 19 is not removed yet. Side edges 52 of the support bracket 35 extending along the edges 25 of the open ended slot 24 are retreated from the edge 25 by a predetermined distance $L_2$ that is greater than an alignment tolerance in the Z direction between the center of the bracket 35 and the center of the layer 36. The effect of the distance $L_2$ and the height of the flattened solder bumps 44 will be described later. Distance $L_2$ is greater than the thickness or height of the solder 44 on the first connecting pad 21. The effect of the distance $L_2$ is described after. It is desirable to position the top of the polyimide layer 37 at a position P which is apart from the lower end of the solder 44 by a $L_3/3$ distance, wherein the $L_3$ represents a length of the flattened solder 44 in the Y direction. This normal Y registration point makes the system insensitive to the tolerances of the components and alignment in the Y direction up to a value of plus/minus $L_3/3$.

FIG. 12(B) shows a step for applying a flux or a soldering flux well known in the art on the flattened solders 44 on the first connecting pads 21 of the extended plates 19 and the solders 40 on the second connecting pads 26 of the circuit board 23. FIG. 12(C) shows a step for reflowing the flattened solders 44 and the solders 40. A non contact heat source is used to direct heat beams 53 onto the solders 44 and 40. Each of the heat beams 53 is controlled to make a rectangular focus area of about 1.3×5.3 mm that easily covers the entire surface area of the solders 44 and 40 of an entire set of four pad pairs. A two beam Xenon laser system, with the two heat beams 53, is a preferred choice for a fast manufacturing system. It is desirable to select an angle between the heat beam 53 and the plane of the circuit board 23 to about 55 degrees.

Figure 14:
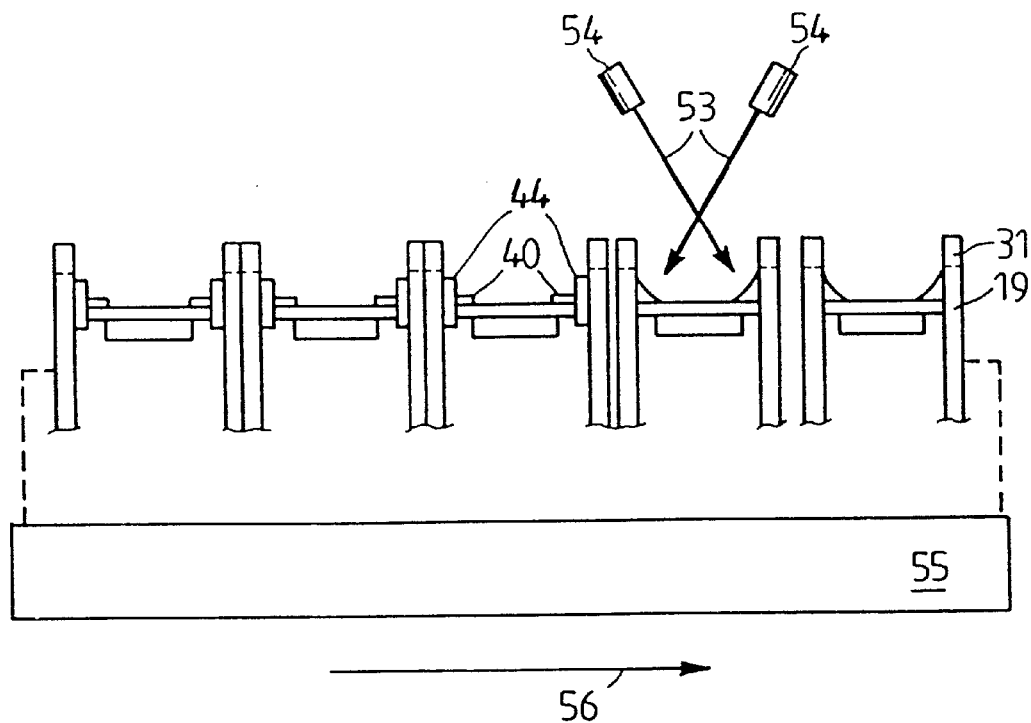
FIG. 14 shows a stepper table and heat sources used in the process in accordance with the present invention.

FIG. 14 shows a stepper table 55 on which the structure shown in FIG. 11 is fixed. The stepper table 55 is stepped in a direction shown by an arrow 56. Two heat sources 54 are fixed. When the solders 44 and 40 are positioned below the heat sources 54, the heat sources 54 are activated to direct the heat beams 53 on to the solders 44 and 40. A time required for reflowing the solders 44 and 40 of one set of four pad pairs is less than 0.5 seconds. The reflow time for the arm assembly 10 containing the ten MR heads becomes less than 10 seconds. The Xenon heat source is replaceable by another heat source, such as, an infrared ray heat source, a halogen lamp heat source, a four beam parallel laser array. That can direct the heat energy simultaneously into at least one entire set of four pad pairs.

Referring to FIG. 12(C), as the solders 44 and 40 are reflowed to make a reflowed solders or a solder fillet 50, the extended arms 19 are moved in directions shown by arrow 56 due to the compliance or flexibility and a self acting bias force in the Z direction. This movement in the Z direction closes any previous Z gap due to the manufacturing tolerances to intimately contact the pads 21 and 26, and allows the two liquefied or reflowed solder volumes to coalesce and to form a fillet joint 50 on cooling. The distance $L_2$ prevents the non electrically conductive support bracket 35 from being contacted to the reflowed solder 50, so that the transfer of the electrostatic charges accumulated on the non electrically conductive support bracket 35 to the reflowed solder 50 which is connected to the MR head is prevented, whereby the damage of the MR head during a use of the disk drive device in the field is prevented.

After the reflow process, the removable plate 31 if present on each of the extended plates 19 is removed along the line 33 shown in FIG. 4. As the system is of low thermal mass and self biasing in terms of force to allow a motion of the extended plate with no high thermal mass flexure tooling in proximity to the solder pads, heat energy can be directed into and absorbed very quickly by the set of solder pads. Therefore, the cleaning requirements for the reflowed solder 50 can be minimized with the following soldering process executed in an essentially oxygen free environment. The structure shown in FIG. 12(A) is immersed in a bath containing an agent such as a glycerol or a detergent instead of the conventional solder flux. The structure is placed on the stepper table 55, and a low volume inert gas, such as Nitrogen gas or Argon gas, is flowed over the solders 44 and 40 during the reflow process.

Figure 13A:
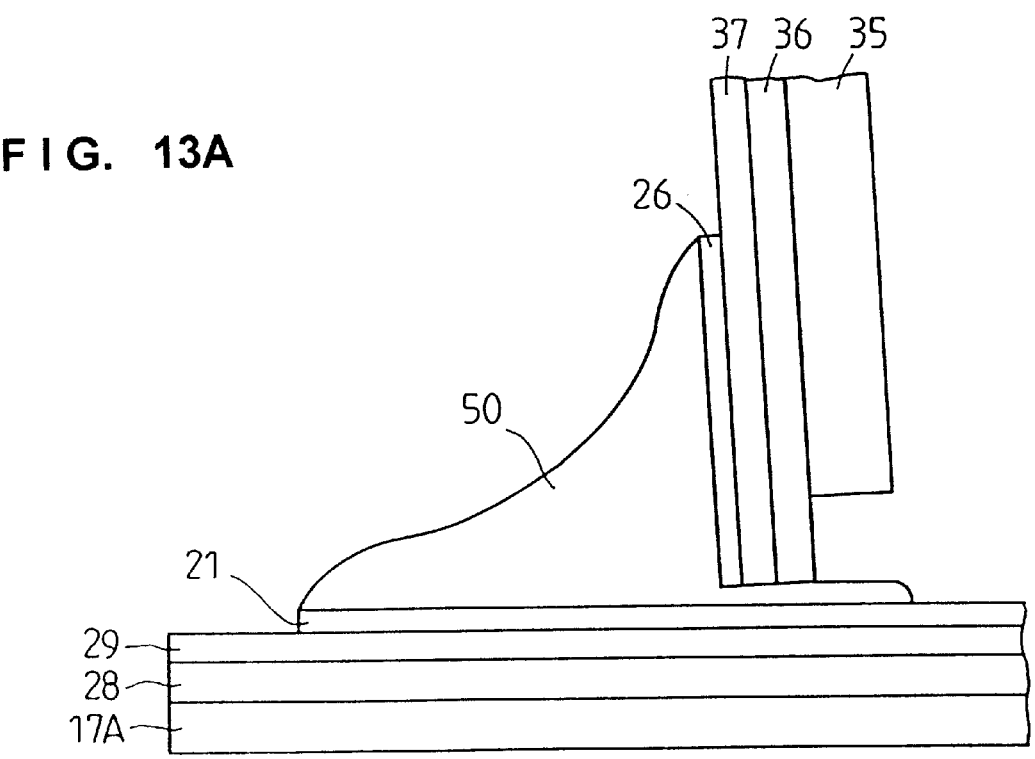
FIG. 13 shows a structure of reflowed solder on the first and second connecting pads.
Figure 13B:
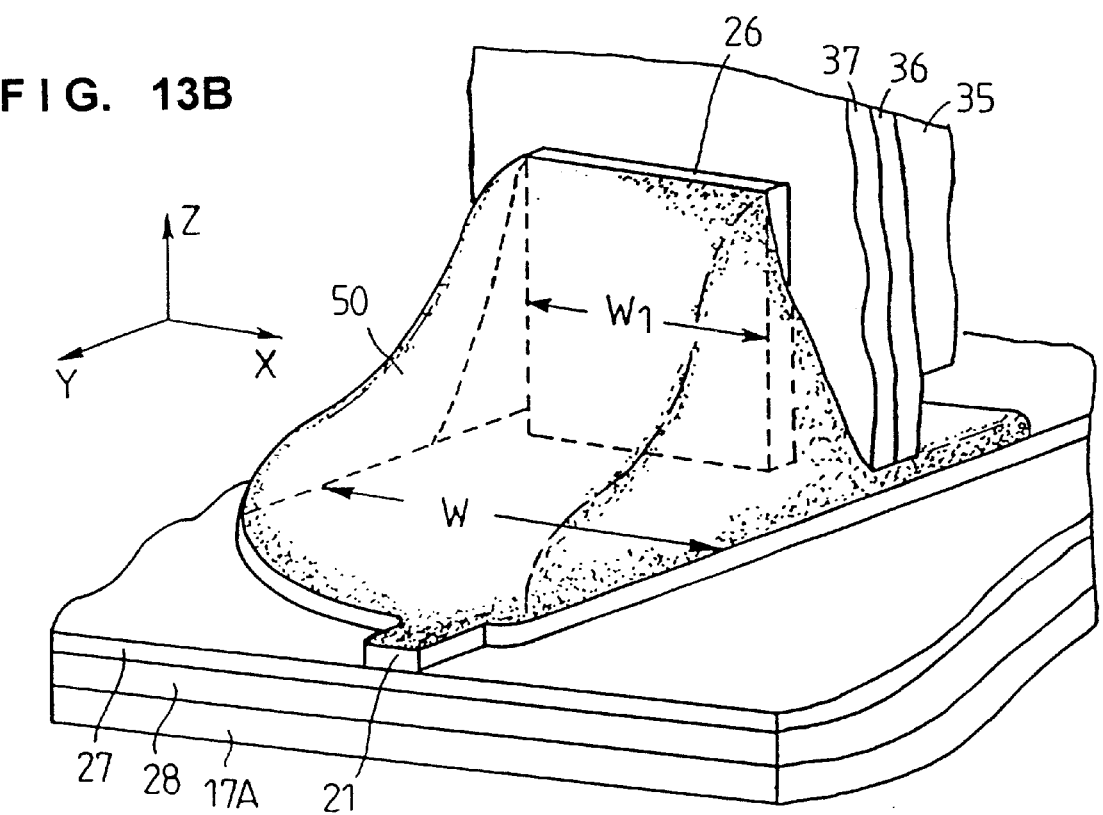

FIGS. 13(A) and (B) show an enlarged view of the reflowed solder 50. FIG. 13(A) shows the 90 degree rotated structure of that shown in FIG. 12(C). The removable plate 31 has been removed from the structure shown in FIGS. 13(A) and (B). FIG. 13(B) shows a perspective view of the reflowed solder 50. Since the width W (0.45 mm) of the first connecting pad 21 is wider than the width $W_1$ (0.3 mm) of the second connecting pad 26, the shape of the reflowed solder 50 viewing in the Y direction is a trapezoid, and the shape of the reflowed solder 50 viewing in the X direction is a substantially right triangle, and the right triangle has a concave oblique side. The size of the solder fillet is determined by the exposed surface of the pads at reflow, and therefore for a nominally aligned set of pads, the height of the reflowed solder 50 in the Z direction is about 0.45 mm, and the length of the base in the Y direction is about 0.6 mm.

As described before, the volume of solder required for the solder reflow joint is on the order of $40 \times 10^{-6}$ cc., and the volume of solder on the first connecting pad 21 should be greater than 60% of a total volume of solder on the first connecting pad 21 and the second connecting pad 26 to make a reliable solder reflow connection between the first and second connecting pads 21 and 26. Because it is that volume of the solder that is on the compliant and movable extended plate, the amount of the compliant motion is a function of the height of the flattened solder bump 21 and is about 80% of that height. It is also easier from a manufacturing perspective to have more solder volume on the pads 21 of the extended plate 19 because these pads are larger in surface area and the stenciling process allows the solder to be dispensed to a greater prereflow height.

Figure 15:
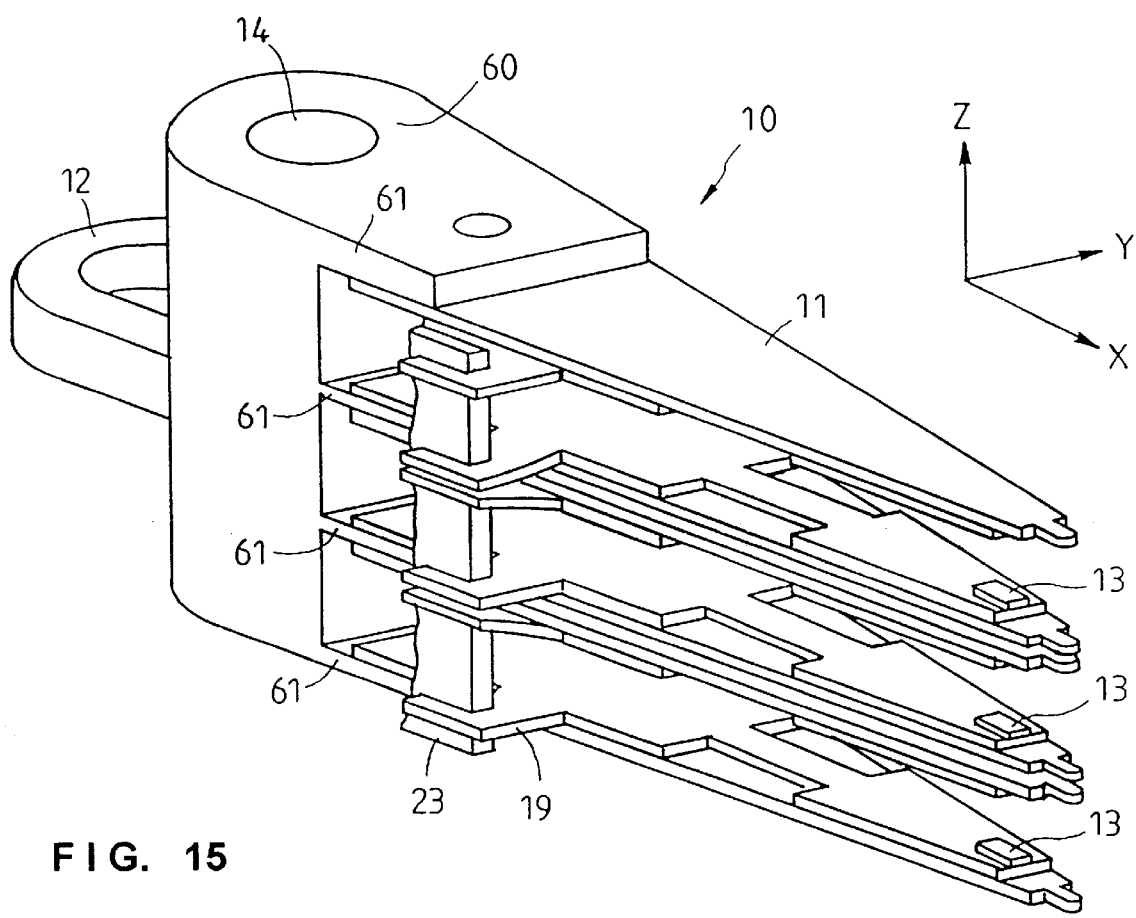
FIG. 15 shows the arm assembly in which the head support arm are fixed on comb elements of a carriage in accordance with the present invention.

FIG. 15 shows an alternate structure of the arm assembly 10 shown in FIG. 2. In the structure shown in FIG. 15, the front end of each of the arms 11 supports the head/slider assembly 13 containing the read/write head, and the rear end of each of the arms 11 is fixed to a comb element 61 of a carriage 60. The carriage 60 is rotated around the shaft 14 by the VCM 12 mounted on the back side of the carriage 60 to move the read/write heads along the radial direction of the rotating data recording disks.

Figure 16A:
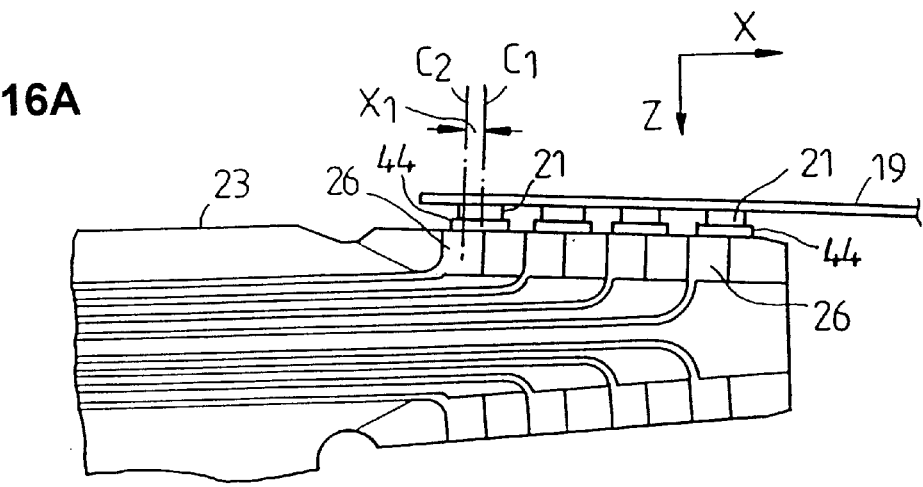
FIG. 16 shows misalignment of the extended plates and the circuit board.

FIGS. 16 and 17 show the meritorious effects realized by the arm assembly 10 in accordance with the present invention. FIGS. 16(A) and (B) show a compensation for the misalignment of the first and second connecting pads 21 and 26 in the X direction. In FIG. 16(A), the first connecting pads 21 of the extended plate 19 are misaligned in the rightward direction as shown by a distance $X_1$ between the center line $C_1$ of the first connecting pad 21 and the center line $C_2$ of the second connecting pad 26.

Figure 16B:
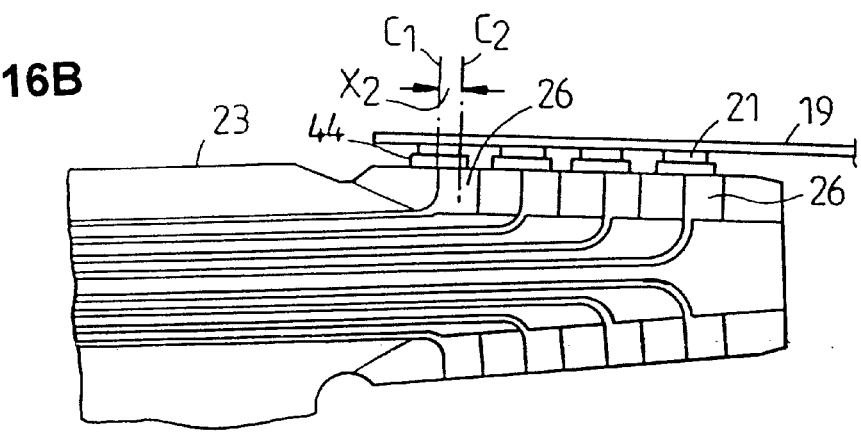
Figure 16C:
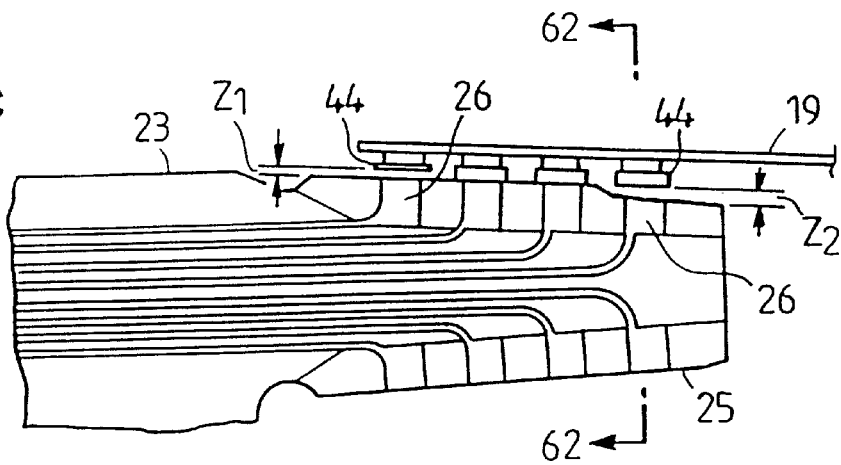

In FIG. 16(B), the first connecting pads 21 of the extended plate 19 are misaligned in the leftward direction as shown by a distance $X_2$ between the center line $C_1$ of the first connecting pad 21 and the center line $C_2$ of the second connecting pad 26. Even if the first and second connecting pads 21 and 26 are misaligned in the X direction, a reliable solder reflow connection between the pads 21 and the pads 26 are realized since the width W of the first connecting pads 21 differs from the width $W_1$ of the second connecting pads 26, in accordance with the present invention.

Figure 18A:
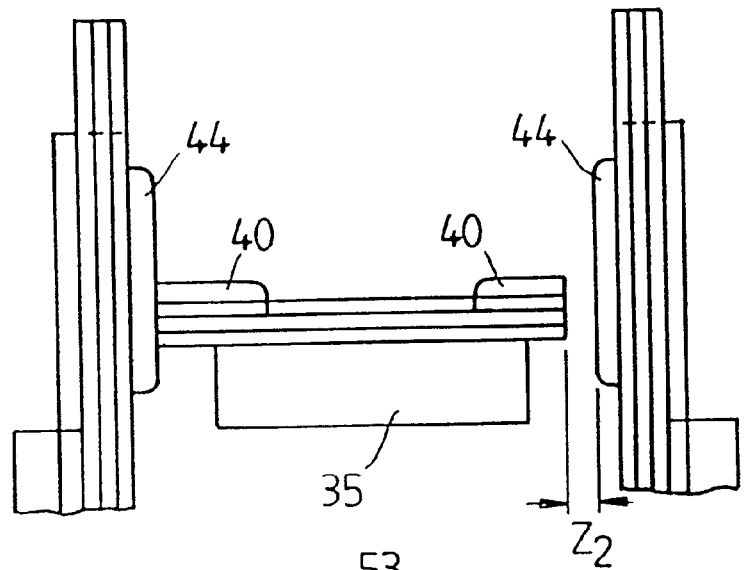
FIG. 18 shows a cross section along a line 62—62 in the FIG. 16(C).
Figure 18B:
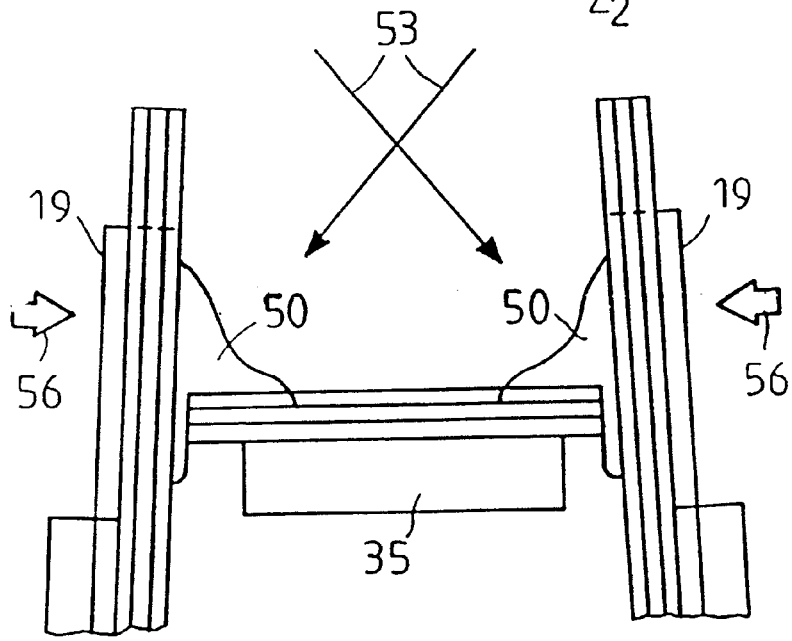

FIG. 16(C) and FIG. 18 which shows a cross section along a line 62—62 in FIG. 16(C) show the case where unexpected small gaps $Z_1$ or $Z_2$ are produced. Many manufacturing tolerance conditions arise which cause unexpected small gaps $Z_1$ to exist between a pair 40 and 44. Some typical examples would be a thinner solder 44 on the pad 21, a draft angle $\theta_2$ on the edge 25 of the slot 24 of the circuit board 23, a non straight edge 25, a burr on the edge of the cut surface 25, or imperfect flatness of the extended plate 19. Since a relatively large amount of the solder exists on the compliant and movable extended plate 19 that has a self biasing force towards the orthogonal circuit board 23 and the edge 25, the extended plate 19 will move towards the edge 25 to close the gaps $Z_1$ and $Z_2$ when the solder is liquefied by the heat source, thereby allowing the solder volume 40 and 44 to coalesce and therefore form a fillet joint 50 when the solder cools. The amount of the motion in the Z direction is a function of the flattened height H of the bump 21 and is approximately equal to 80% of the height.

Figure 17A:
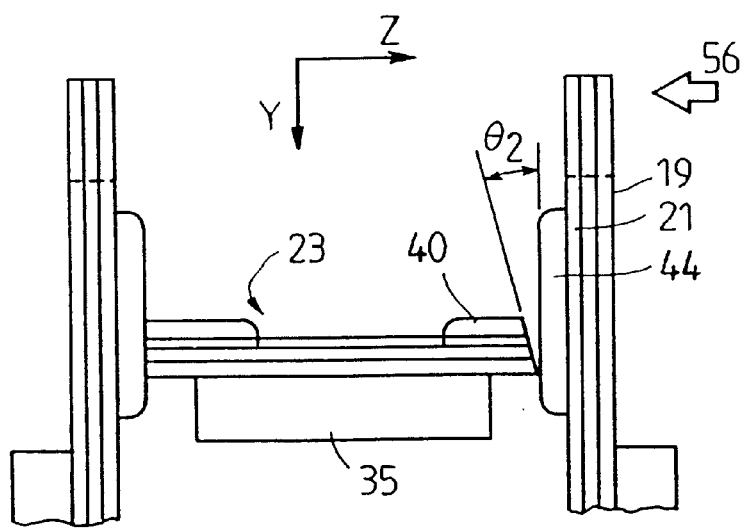
FIG. 17 shows misalignment of the extended plates and the circuit board.
Figure 17B:
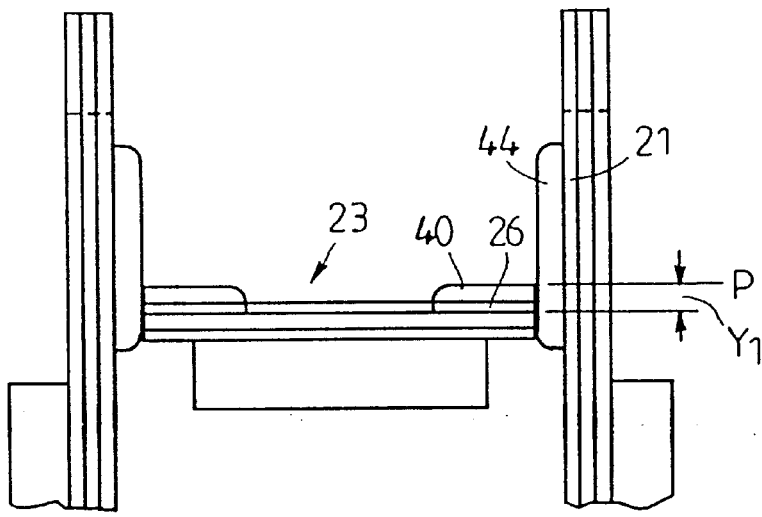
Figure 17C:
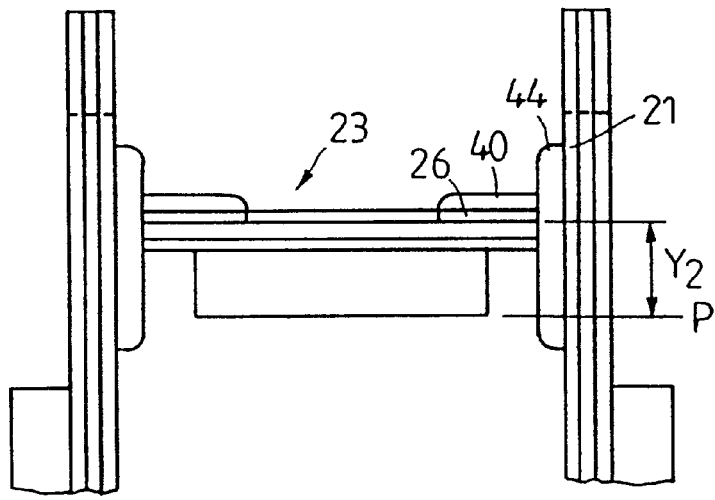

FIGS. 17(A) through (C) show another expected misalignment of the extended plate 19 and the circuit board 23. It is noted that the structure of FIGS. 17(A) through (C) is substantially the same as the structure shown in FIG. 12, so the reference numbers of the detailed parts are not shown in FIGS. 17(A) through (C). FIG. 17(A) shows the case in which the punched edge of the open ended slot 24 of the circuit board 23 is angled from the Y axis by an angle $\theta_2$. The gap between the solders 44 and 40 does not cause a problem since, as the solders 44 and 40 are reflowed, the extended plate 19 moves in the direction of an arrow 56 due to its flexibility or compliance in the Z direction, as described with respect to FIG. 12(C), so that the reflowed solders 44 and 40 easily join each other.

FIGS. 17(B) and (C) show the misalignment of the extended portion 19 and the circuit board 23 in the Y direction. FIG. 17(B) shows that the position of the circuit board 23 is lowered from the desired position P described in FIG. 12(A) by a distance $Y_1$, and FIG. 17(C) shows that the position of the circuit board 23 is raised from the desired position P by a distance $Y_2$. It is apparent that the relationship in the contact between the solder 44 on the first connecting pad 21 and the solder 40 on the second connecting pad 26 is not changed even if the extended portion 19 and the circuit board 23 are misalignment in the Y direction, so that a reliable solder connections are realized.

The present invention solves the problems in the wiring system using the discrete wires of the prior disk drive device. The structure of the arm assembly and the fabrication method of the arm assembly in accordance with the present invention realize the reliable connections between the conductors connected to the read/write head on the head supporting arm 11 and the conductors on the circuit board 23 connected to the read/write circuit.

While the preferred embodiments of the present invention have been illustrated in detail, it should be apparent that modifications and adaptations to those embodiments may occur to one skilled in the art without departing from the scope of the present invention as set forth in the following claims.

We claim:

1. An arm assembly for a disk drive comprising:
   a plurality of arms arranged in parallel to each other, one end of each of said arms supporting a read/write head, and each of said arms having an extended plate which cantilevers from one of the side edges of said arm, said extended plate being capable of deflecting in a direction which is vertical to a plane of said arm, and rotationally gimbal to a limited degree about two axes in the plane of said arm;
   a plurality of first electrically conductive connecting pads provided on each of said extended plates, said first connecting pads being connected to said read/write head; and
   a circuit board which comprises a non-electrically conductive support member, an insulating layer, and second electrically conductive connecting pads, the insulating layer and second conducting pads extending beyond the edge of the support member and engaging with said cantilever extended plate, characterized in that the plane of said circuit board is approximately orthogonal to the plane of the extended plate and is so located with respect to said extended plates of said plurality of arms to align said second connecting pads to said first connecting pads on each of said extended plates.

2. An arm assembly according to claim 1, wherein said first connecting pads and said second connecting pads are connected by a solder.

3. An arm assembly according to claim 1, wherein said first connecting pads are provided on said extended plate along X axis direction which is the substantially parallel to a longitudinal direction of said arm, and a width of said first connecting pad along said X axis direction differs from a width of said second connecting pad along said X axis direction.

4. An arm assembly according to claim 3 wherein a width of said first connecting pad along said X axis direction is wider than a width of said second connecting pad along said X axis direction.

5. An arm assembly according to claim 4, wherein said first connecting pad has a length along Y axis direction which is parallel to a direction along a width of said arm, said first connecting pad has a surface defined by said width and a length, a cross sectional portion of said second connecting pad is intimately adjacent and in close proximity to said surface of said first connecting pad.

6. An arm assembly according to claim 5, said cross sectional portion of said second connecting pad is positioned at a position of about ⅓ of said length along said Y axis of said first connecting pad to accommodate a tolerance of misalignment of said cross sectional portion of said second connecting pad and said first connecting pad in said Y axis or a rotational tilt tolerance of said circuit board about X axis which is a longitudinal direction of said arm.

7. An arm assembly according to claim 1, wherein a space available on said circuit board defined by a height of said plurality of arm in a direction perpendicular to a plane of said arm and a length of said circuit board in a longitudinal direction of said arm is sufficient to package a head element write driver and a read pre-amplifier electronics circuit.

8. An arm assembly according to claim 1, wherein said second connecting pads on said circuit board have no degrees of motion freedom but said second connecting pads are precisely ordered with respect to each being created by a photolithographic process and said first connecting pads of said extended plate are precisely ordered and fixed with respect to each other in three degree of freedom but can deflect in a direction normal to a plane of said arm and gimbal to a limited degree about the two axes in said plane of said arm.

9. An arm assembly for a disk drive device comprising:
   a plurality of arms arranged in parallel to each other with a space, one end of each of said arms being fixed to each other;
   the other end of each of said arms supporting a read/write head, and each of said arms having an extended plate which cantilevers from one of the side edges of said arm;
   a plurality of first electrically conducting connecting pads provided on each of said extended plates, said first connecting pads being connected to said read/write head; and
   a circuit board comprising a non-electrically conductive support member, an insulating layer, and second electrically conducting connecting pads, the insulating layer and second conducting pads extending beyond the edge of the support member, the circuit board provided with a plurality of open ended slots for receiving said extended plates, the plurality of second connecting pads being provided on a surface portion of each of the edges of said open ended slots, characterized in that said circuit board is approximately orthogonal to the plane of said extended plates of said plurality of arms to align said second connecting pads on said edges of said open ended slots with said first connecting pads on each of said extended plates.

10. An arm assembly according to claim 9, wherein said first connecting pads are positioned with respect to a datum system in a plane of said arm rotationally about Z axis normal to said plane of arm, but said extended plate can flex in a direction of said Z axis and is free to gimbal to a limited degree about X axis which is parallel to a longitudinal direction of said arm and Y axis which is parallel to a width of said arm.

11. An arm assembly according to claim 9, wherein said first connecting pads and said second connecting pads are connected by solder.

12. An arm assembly according to claim 9, wherein said first connecting pads are provided on said extended plate along X axis direction which is the substantially parallel to a longitudinal direction of said arm, and a width of said first connecting pad along said X axis direction differs from a width of said second connecting pad along said X axis direction.

13. An arm assembly according to claim 12, wherein said first connecting pads and said second connecting pads are connected by solder.

14. An arm assembly according to claim 12, wherein said first connecting pad has a length along Y axis direction which is parallel to a direction along a width of said arm, said first connecting pad has a surface defined by said width and said length, a cross sectional portion of said second connecting pad is adjacent and in close proximity to said surface of said first connecting pad.

15. An arm assembly according to claim 14, wherein said first connecting pads and said second connecting pads are connected by solder.

16. An arm assembly according to claim 15, wherein a support plate is attached on a back surface of said circuit board opposing to said surface portion, said support plate having side edges along said edges of said open ended slot, said side edge of said support plate being retreated from said edge of said open ended slot by a predetermined distance.

17. An arm assembly according to claim 16, wherein said support plate is made of an electrically non-conductive material.

18. An arm assembly according to claim 9, wherein said first connecting pads are provided on an edge portion of said extended plate along X axis direction which is the substantially parallel to a longitudinal direction of said arm, and a slot is provided in said edge portion of said extended portion to separate said plurality of first connecting pads into two groups.

19. An arm assembly for a disk drive device comprising:
   a plurality of arms arranged in parallel to each other with a space, one end of each of said arms being fixed to comb elements of a carriage, the other end of each of said arms supporting a read/write head, and each of said arms having an extended plate which cantilevers from one of the side edges of said arm, and a plurality of first electrically conductive connecting pads provided on each of said extended plates, said first connecting pads being connected to said read/write head, a circuit board which comprises a non-electrically conductive support member, an insulating layer, and second electrically conductive connecting pads, the insulating layer and second conducting pads extending beyond the edge of the support member, the circuit board provided with a plurality of open ended slots for receiving said extended plates, the plurality of second connecting pads being provided on a surface portion of each of the edges of said open ended slots, characterized in that said circuit board is approximately orthogonal to the plane of said extended plates of said plurality of arms to align said second connecting pads on said edges of said open ended slots with said first connecting pads on each of said extended plates.

20. An arm assembly according to claim 19, wherein said first connecting pads and said second connecting pads are connected by solder.

21. A disk drive device comprising:
   data recording disks rotated by a drive motor, and an arm assembly;
   said arm assembly comprising:
      a plurality of arms arranged in parallel to each other, one end of each of said arms being fixed to each other, the other end of each of said arms supporting a read/write head, and each of said arms having an extended plate which cantilevers from one of the side edges of said arm;
      a plurality of first electrically conductive connecting pads provided on each of said extended plates, said first connecting pads being connected to said read/write head; and
      a circuit board comprising a non-electrically conductive support member, an insulating layer, and second electrically conductive connecting pads, the insulating layer and second conducting pads extending beyond the edge of the support member, the circuit board provided with a plurality of open ended slots for receiving said extended plates, the plurality of second connecting pads being provided on a surface portion of each of the edges of said open ended slots, characterized in that said circuit board is approximately orthogonal to the plane of the extended plates of said plurality of arms to align said second connecting pads on said edges of said open ended slots with said first connecting pads on each of said extended plates.

22. A disk drive device according to claim 21, wherein said first connecting pads and said second connecting pads are connected by solder.

23. A disk drive device according to claim 21, wherein said first connecting pads are provided on said extended plate along X axis direction which is the substantially parallel to a longitudinal direction of said arm, and a width of said first connecting pad along said X axis direction differs from a width of said second connecting pad along said X axis direction.

24. A disk drive device according to claim 23, wherein said first connecting pads and said second connecting pads are connected by solder.

25. A disk drive device according to claim 23, wherein said first connecting pad has a length along the Y axis direction which is parallel to a direction along a width of said arm, said first connecting pad has a surface defined by said width and said length, a cross sectional portion of said second connecting pad is adjacent and close proximity to said surface of said first connecting pad.

26. A disk drive device according to claim 25, wherein said first connecting pads and said second connecting pads are connected by solder.

27. A disk drive device according to claim 26, wherein a support plate is attached on a back surface of said circuit board opposing to said surface portion, said support plate having side edges along said edges of said open ended slot, said side edge of said support plate being retreated from said edge of said open ended slot by a predetermined distance.

28. A disk drive device according to claim 27, wherein said support plate is made of an electrically non-conductive material.

29. A disk drive device according to claim 21, wherein said first connecting pads are provided on an edge portion of said extended plate along the X axis direction which is the substantially parallel to a longitudinal direction of said arm, and a slot is provided in said edge portion of said extended portion to separate said plurality of first connecting pads into two groups.

* * * * *